(12) United States Patent
Marrion et al.

(10) Patent No.: US 8,442,304 B2
(45) Date of Patent: May 14, 2013

(54) SYSTEM AND METHOD FOR THREE-DIMENSIONAL ALIGNMENT OF OBJECTS USING MACHINE VISION

(75) Inventors: Cyril C. Marrion, Acton, MA (US); Nigel J. Foster, Natick, MA (US); Lifeng Liu, Arlington, MA (US); David Y. Li, West Roxbury, MA (US); Guruprasad Shivaram, Chestnut Hill, MA (US); Aaron S. Wallack, Natick, MA (US); Xiangyun Ye, Framingham, MA (US)

(73) Assignee: Cognex Corporation, Natick, MA (US)

( * ) Notice: Subject to any disclaimer, the term of this patent is extended or adjusted under 35 U.S.C. 154(b) by 910 days.

(21) Appl. No.: 12/345,130

(22) Filed: Dec. 29, 2008

(65) Prior Publication Data

US 2010/0166294 A1    Jul. 1, 2010

(51) Int. Cl.
*G06K 9/00* (2006.01)

(52) U.S. Cl.
USPC .................... 382/154; 382/190; 382/294

(58) Field of Classification Search .................. 382/154, 382/190, 294
See application file for complete search history.

(56) References Cited

U.S. PATENT DOCUMENTS

| | | | |
|---|---|---|---|
| 5,257,203 A | 10/1993 | Riley et al. | |
| 6,075,881 A | 6/2000 | Foster et al. | |
| 6,078,701 A | 6/2000 | Hsu et al. | |
| 6,151,406 A | 11/2000 | Chang et al. | |
| 6,178,392 B1 * | 1/2001 | Mack et al. | 703/7 |
| 6,476,803 B1 | 11/2002 | Zhang et al. | |
| 6,553,138 B2 | 4/2003 | Rozin | |
| 6,728,582 B1 * | 4/2004 | Wallack | 700/64 |
| 7,027,642 B2 | 4/2006 | Rubbert et al. | |
| 7,068,825 B2 * | 6/2006 | Rubbert et al. | 382/128 |
| 7,305,121 B2 * | 12/2007 | Kaufmann et al. | 382/154 |
| 7,414,732 B2 | 8/2008 | Maidhof et al. | |
| 2003/0123713 A1 * | 7/2003 | Geng | 382/118 |
| 2007/0081714 A1 * | 4/2007 | Wallack et al. | 382/152 |

OTHER PUBLICATIONS

Godin et al., "Three-Dimensional Registration Using Range and Intensity Information," 1994, SPIE, vol. 2350, pp. 279-290.*
Faugeras et al, "The Representation, Recognition, and Locating of 3-D Objects", 1986, pp. 27-52, vol. 5, No. 3, Publisher: Massachusetts Institute of Technology, Published in: Massachusetts.
P. Wunsch et al, "Real-Time Pose Estimation of 3-D Objects from Camera Images Using Neural Networks", Apr. 2007, pp. 3232-3237, Publisher: IEEE, Published in: Albuquerque.

(Continued)

*Primary Examiner* — John Strege
(74) *Attorney, Agent, or Firm* — Loginov & Assc., PLLC

(57) ABSTRACT

This invention provides a system and method for determining the three-dimensional alignment of a modeled object or scene. A 3D (stereo) sensor system views the object to derive a runtime 3D representation of the scene containing the object. Rectified images from each stereo head are preprocessed to enhance their edge features. 3D points are computed for each pair of cameras to derive a 3D point cloud. The amount of 3D data from the point cloud is reduced by extracting higher-level geometric shapes (HLGS), such as line segments. Found HLGS from runtime are corresponded to HLGS on the model to produce candidate 3D poses. A coarse scoring process prunes the number of poses. The remaining candidate poses are then subjected to a further more-refined scoring process. These surviving candidate poses are then verified whereby the closest match is the best refined three-dimensional pose.

27 Claims, 14 Drawing Sheets

OTHER PUBLICATIONS

Stephane Lavalee et al, "Recovering the Position and Orientation of Free-Form Objects from Image Contours Using 3D Distance Maps", Apr. 17, 1995, pp. 378-382, vol. 17, No. 4, Publisher: IEEE, Published in: New York.

Wunsch et al, "Registration of CAD-Models to Images by Interactive Inverse Perspective Matching", 1996, pp. 78-83, Publisher: IEEE, Published in: Wessling.

Suetens, et al., "Computational Strategies for Object Recognition", "Computing Surveys", Mar. 1992, pp. 5-61, vol. 24, No. 1, Publisher: ACM.

Chin, et al., "Model-Based Recognition in Robot Vision", "Computing Surveys", Mar. 1986, pp. 67-108, vol. 18, No. 1, Publisher: ACM, Published in: US.

Jost, et al., "A Multi-Resolution ICP With Heuristic Closest Point Search for Fast and Robust 3D Registration of Range Images", "Fourth International Conference on 3-D Digital Imaging and Modeling", Oct. 6, 2003, pp. 427-433, Publisher: IEEE.

Wallack, et al., "Object Recognition and Localization From Scanning Beam Sensors", "International Conference on Robotics and Automation", 1995, pp. 247-254, Publisher: IEEE, Published in: US.

Faugeras, "Three-Dimensional Computer Vision—A Geometric Viewpoint", 1993, pp. 211-213; 483-534, Publisher: MIT Press.

Besl, et al., "Three-Dimensional Object Recognition", "Computing Surveys", Mar. 1985, pp. 75-145, vol. 17, No. 1, Publisher: ACM, Published in: US.

Godin, et al., "Three-Dimensional Registration Using Range and Intensity Information", "Videometrics", 1994, pp. 279-290, vol. 2350, No. III, Publisher: SPIE, Published in: CA.

* cited by examiner

SYSTEM AND METHOD FOR THREE-DIMENSIONAL ALIGNMENT OF OBJECTS USING MACHINE VISION

FIELD OF THE INVENTION

This invention relates to machine vision systems and methods used for alignment of objects with respect to a reference frame; and more particularly to systems and methods for alignment of parts with respect to a three-dimensional reference frame.

BACKGROUND OF THE INVENTION

Machine vision has become an essential component in many modern manufacturing processes. One particular use for machine vision is to determine the alignment or pose of a particular component or surface so that the component or surface can be operated on by a tool or robotic manipulator that requires knowledge as to how to orient itself to engage and pick up the component, or perform work on the component or surface. For example, a parts picker that lifts bolts from a bin requires knowledge as to the location of the head of the bolt and the direction in which it is oriented to properly grasp the bolt and direct it to a given target bolt hole in a device under construction.

The power and usefulness of vision systems for use in manufacturing and other applications has increased in recent years due to significant increases in computing power. Capabilities that were unavailable only a few years ago are now available in relatively basic systems.

While current commercially available vision systems are extremely effective for determining alignment in a wide range of applications, they typically rely upon a two-dimensional, or "2D" (e.g. x, y), representation of the viewed subject. That is, the acquired pixels constituting an image of the subject are arranged in a two-dimensional array of pixels. Each pixel can be addressed by its (x, y) coordinates. The value of each pixel in the image is a grayscale value representing the amount of light striking the corresponding sensing element in the camera. Such two-dimensional representations are processed with respect to a model in an image field consisting of x and y coordinates. However, the alignment of many objects is not completely resolvable in only two dimensions due to their geometry and surface coloration/shading. In many cases the geometrical complexity of the object, and/or the need to accurately align with respect to an element of the object that projects in a third dimension may limit the effectiveness of algorithms and tools that are based on the acquisition of two-dimensional images. Additionally, many objects appear very differently in a two-dimensional image after undergoing only small amounts of tilt relative to the camera and its associated image plane. Thus, the alignment of an object that was clearly recognized by the system in one orientation may be less-recognizable or unrecognizable to the system in a slightly different orientation.

The majority of imaging systems today acquire two-dimensional images of a three-dimensional ("3D") scene or object. That is, a three-dimensional geometric shape is resolved by the system into a two-dimensional image. A significant amount of useful information about a 3D scene or 3D object is lost when that scene or object is projected onto a 2D image. That lost information is the distance which the various parts of the scene or object are from the camera, and is typically termed "depth information" or "depth data". The loss of this depth data may make it significantly more difficult to accurately and robustly determine the 3D pose of objects.

Currently, there are commercially available devices that allow acquisition of visual data in order to produce a 3D representation (depth data) of the above-described 3D scene or object. Such devices are herein termed "3D sensors". A popular type of 3D sensor presently in use is a stereo camera head. Stereo camera heads are generally comprised of multiple 2D cameras arranged in a predetermined, typically fixed orientation with respect to each other. Each of the 2D cameras acquires a 2D image of the 3D scene or 3D object from a different vantage point with respect to the scene or object.

Several techniques can be employed by 3D sensors, in determining the depth data. One technique measures the delay of time between transmission of a light pulse and receipt of the reflected light pulse—a technique called Light Detection and Ranging or LIDAR. In alternate examples, structured light, or devices that employ a scanning laser can also be used to generate depth data. A particular depth data-determination technique employs triangulation. This technique locates a feature in the scene or on the object in two or more of the images respectively acquired from each of 2D cameras, and using the relative position of the feature in each of the images, triangulation is performed to recover the depth information for that feature. In the particular example of a stereo camera head, the output of each 2D camera is in fact a 2D array of pixel values (image) and associated intensity. The 2D array of pixel values is combined using geometric algorithms to generate the corresponding z (depth) value for each pixel. The z values for each pixel are typically stored in a depth image. Depth images are typically the same size in width and height as the acquired grayscale or color image but their pixel values represent depth or distance from the camera. The depth or distance from the camera dimension provides the z-component of a 3D representation of a scene or object. However, the process of computing z values consumes additional time when compared with the acquisition of only a two-dimensional image. From acquired depth images, found 3D points of the representation can be derived. These found 3D points can be used in subsequent processes.

After acquiring a 3D representation of the scene or object, the remaining task in 3D alignment is to determine the best transform between a pre-existing 3D model of the scene or object to the acquired scene or object. The model can be provided by acquiring images of the scene or object at known alignments and/or can be provided synthetically, by entering the locations of various features as data points. The transform between the 3D model data and the 3D acquired data is the pose, and is the goal of 3D alignment.

A "brute force" approach to computing the pose is to iterate over the possible point-to-point correspondences between the found 3D points and a set of model 3D points (provided by any acceptable technique), and then for each set of correspondences compute the pose which best aligns the found points to the model points. Typical 3D representations produced by current 3D sensors are most often in the form of 3D point clouds. These 3D point clouds often contain thousands to hundreds of thousands of 3D points. The large number of found 3D points, and the significantly large number of possible correspondences between found points and model points, renders a brute force approach to determining the pose intractable.

Achieving a rapid, robust, and accurate 3D alignment solution using a 3D sensor system is a technically challenging problem. In an industrial setting, the solution must be achieved accurately and quickly for each object being aligned. The availability of higher-power computing systems offers opportunities to address this problem. Thus, it is desirable to provide a system and method for 3D alignment of objects that is robust, efficient and reliable, and that accommodates the additional processing overhead encountered in 3D image acquisition and processing. This system and method should enable accurate alignment of a large variety of 3D objects, and should enable such alignment at speeds that accommodate the normal rate of operation on a manufacturing production line or other industrial environment.

SUMMARY OF THE INVENTION

This invention overcomes the disadvantages of the prior art by providing a system and method for determining the three-dimensional (3D) alignment (in six degrees of freedom) of an object with respect to model image data. The system and method produce an efficient, robust and accurate result for a wide variety of object shapes and shading patterns. In an illustrative embodiment, a 3D sensor system (consisting of one or more stereo camera heads, for example) views the area in which the object will be aligned from one or more vantage points after the 3D sensors have undergone camera calibration, and the 3D sensor system has undergone world calibration with respect to the world 3D coordinate space of the object viewing area. A 3D model is provided to the system according to an appropriate technique in a form that is readily consumable by the system's alignment algorithm. The model can be adapted to provide a sufficient number of edges and/or other clearly resolvable features in the subject object. During runtime, following training of the model, the 3D sensor system generates a 3D point cloud of the object using one or more 3D sensors located at one or more discrete vantage points with respect to the runtime object. In an embodiment, the point cloud is generated with an exemplary stereo camera head arrangement by first rectifying the acquired images from each camera. The rectified images are then preprocessed, using for example, a zero-crossing technique, to enhance their edge features. A stereo matching process is then performed on at least two (a pair) of the rectified preprocessed images at a time by locating a predetermined feature on a first image and then locating the same feature in the other image (typically at zero-crossings of each of the images). The difference, if any, between the respective locations of each feature in the pair of images defines a disparity that is computed as the depth and encoded into the resulting depth image. 3D points are then computed for each camera pair based upon the disparity (a non-zero pixel value) in the depth image with the depth represented in physical units. The 3D point cloud is then generated by transforming the 3D points of each camera pair into the world 3D coordinate space established during the world calibration. In order to reduce processing overhead and increase speed, the amount of 3D data from the point cloud is reduced by extracting higher-level geometric shapes (HLGS). As the point cloud consists of object edges, the points can define a particular HLGS on the object, such as line segments and non-straight curves. In the present example, the system searches the cloud for 3D collinear points that represent discrete line segments/curves and extracts them—any duplicate segments/curves are removed. Next, the system corresponds a pair of found HLGS (non-parallel segments for example) from the runtime object to a pair of HLGS on the model to produce six-degree-of-freedom candidate poses. All, or a large majority, of correspondences (candidate poses) can be made in an initial step. Generally, different subsets of the extracted HLGS are exhaustively corresponded to the HLGS of the model. Each candidate correspondence implies a mapping or pose between the subset of extracted features and the model. A scoring process can reduce the number of candidate poses using a coarse scoring process—for example, defining a radius about a given line segment and eliminating correspondences in which one or both endpoints of a corresponded line segment diverges outside that radius. The remaining candidate poses can then be subjected to a further more-refined, fine scoring process—for example the degree into which a found runtime line segment is aligned with a model line segment until a relatively small predetermined number remain. These surviving candidate poses can then be subjected to a verification process in which the found 3D points or their projection to 2D points of the candidate poses are fitted to a larger set of corresponding 3D model points or their projection to 2D model points, and the closest match is produced as the a high scoring pose that is acceptable to deliver the desired alignment solution.

In a number of embodiments, the system and method can employ a variety of 3D sensor arrangements including, but not limited to 2D image sensors arranged in a binocular stereo camera head or an L-shaped trinocular stereo camera head. 3D sensors can be provided at a plurality of vantage points with respect to an object-viewing/alignment area, and the data from the plurality of 3D sensors is substantially simultaneously acquired to avoid potential mismatch of image data acquired from different sensors due to vibration or movement of the viewed object. The three-dimensional HLGS data can be based upon any of a number of geometric features including line segments, edgelets, arcs, splines, facets, etc.

BRIEF DESCRIPTION OF THE DRAWINGS

The invention description below refers to the accompanying drawings, of which.

DETAILED DESCRIPTION

I. System Setup

Figure 1:
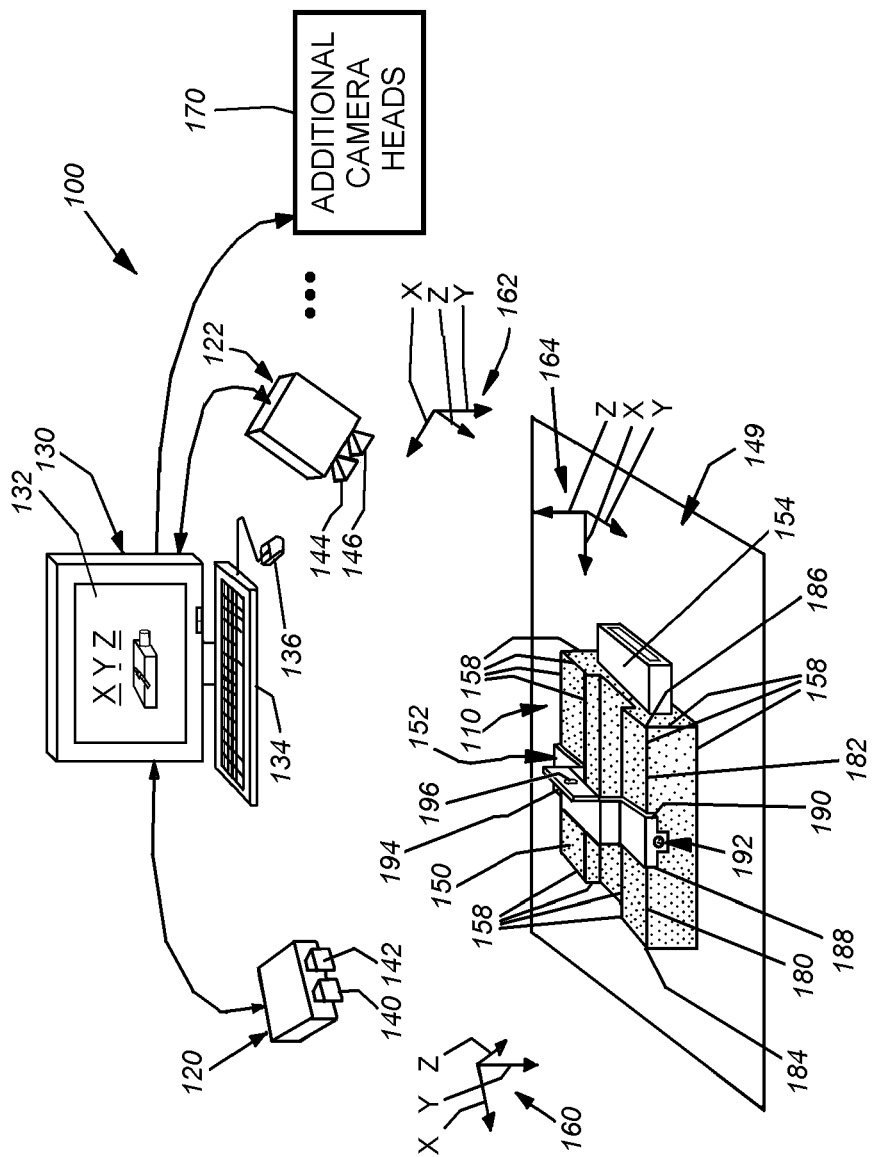
FIG. 1 is a diagram of a system for determining the three-dimensional alignment of an object, employing a plurality of exemplary stereo camera heads according to an embodiment of this invention.

FIG. 1 depicts a typical arrangement for a system 100 for determining the three-dimensional alignment, or pose, of a viewed object 110 according to an illustrative embodiment of this invention. In this example the system 100 employs a plurality of exemplary three-dimensional stereo camera heads 120 and 122 that are interconnected with an exemplary image processing system 130. In this example, the image processing system is a PC-type computer having a display 132, keyboard 134 and mouse interface 136. The PC includes appropriate video processing components and executes program instructions contained in a computer-readable medium that enable the system and method in accordance with this invention. It should be clear to those of skill in the art, that a PC is only one type of image processing device. In alternate embodiments, the processing components can reside directly within the housings of one or more of the stereo head cameras (or other 3D sensors), and the discrete camera heads/3D sensors can be adapted to communicate by cables and/or wirelessly with the processing components.

The exemplary object 110 is a complex three-dimensional shape, which comprises an electronic component having a dark body section (exemplified by the shading) 150, a semi-specular metallic bracket section 152 and a white or lightly colored connector section. The body 150 comprises a plurality of continuous edges 158 that join together to define various surface planes. The bracket 152 and connector 154, likewise define various continuous edges and planes. Note that the bracket 152 occludes some of the edges of the body 150, creating a more complex set of intersecting edges. As will be discussed further below, the object 110, which can be successfully aligned in three dimensions and six degrees of freedom in accordance with the teachings of this invention, is a technically challenging shape to align due to the large number of intersecting lines. However, this shape also presents a number of continuous elongated edges or other clearly resolvable features that can be resolved into a plurality of discrete geometric shapes, such as line segments, edgelets or splines. These higher-level geometric shapes (HLGS) enable the more rapid correspondence of pose data to the acquired three dimensional data. In general, objects to be identified in accordance with this invention include continuous features such as line segments, corners, curves or other definitive shapes that can be resolved from a point cloud.

In this embodiment, as described further below, one or more stereo camera heads 120 and 122 are employed to image the viewing area and object 110 from different vantage points. However, additional 3D sensors (represented by block 170), can be provided to view the object 110 at additional vantage points for reasons described below. Each stereo camera head 120 and 122 includes a respective pair of two-dimensional (2D) cameras 140, 142 and 144, 146. Stereo camera heads operate by creating a pair of discrete images of the object. The spacing or "baseline" between the 2D cameras in a particular stereo camera head allows the imaging head to determine the relative range or depth from the cameras to the object 110. The baseline is 8 to 12 centimeters typically, while the working distance to the object 110 tends to be significantly longer.

A disadvantage inherent in a conventional stereo camera head is that they are blind to edges in the field of view that are nearly parallel to the baseline of the sensors. In other words, a stereo head that is mounted horizontally is unable to accurately locate object edges that are within approximately ±20 degrees of the horizontal plane. In the embodiment of FIG. 1, this disadvantage is overcome in part by providing the two or more stereo camera heads 120, 122. In an embodiment, the two depicted stereo camera heads can be oriented with image axes that view the object from different vantage points. This aids in acquiring edges that may be blind to one of the heads, since they will be distinguishable to the other of the heads. As described above, it is expressly contemplated that more than two stereo camera heads (or other types of 3D sensors) (block 170) can be positioned at additional vantage points with respect to the object 110 and stage 149. The positioning of 3D sensors at various angles can address any blind edges and also fill in missing edges in the overall acquired image resulting from possible occlusion of parts of the object due to a particular head's orientation with respect to the object. In other words, stereo camera head views parts of the object that are obstructed, occluded, or with unresolvable with respect to the view of another head. By providing multiple heads at a plurality of orientations about the object, the aberrations and inconsistencies in each different view can be cancelled out. In general, the one or more 3D sensors are arranged to allow acquisition of a 3D representation of a scene (that can contain an object to be aligned in six degrees of freedom) from which 3D geometric features can be extracted, as described in detail below.

In an embodiment, and as described generally above by way of background, a 3D sensor as defined herein is any device that generates a 3D representation of a scene by any acceptable mechanism or technique. Thus, a "3D sensor" includes a plurality (2 or more) of 2D cameras that are rigidly attached at a fixed or variable baseline, or a plurality (2 or more) of 2D cameras each located at different vantage points with respect to the scene (that may or may not be rigidly attached). By way of example, a multiplicity (three or more) cameras supported in a mount (such as a geodesic dome structure having cameras mounted on facet panels or intersections between dome panels) overlying the scene can be considered a 3D sensor, or discrete pairs, triplets or quads of the 2D cameras within a large grouping can be a considered discrete 3D sensor in a grouping of 3D sensors. Likewise, while it is contemplated that simultaneous acquisition of images by multiple cameras is provided in an embodiment, in an alternate embodiment, one or more 2D cameras can each act to acquire multiple images separated by time—such as where a camera is located on a robot manipulator and moves between different vantage points to acquire images of the scene at each vantage point. Likewise, a single camera that employs lens arrangements to acquire a plurality of images at different vantage points, either separated by time, or within separate portions of the camera's overall field can be considered a 3D sensor. Alternatively, a camera that acquired images using a structured light stripe can be implemented as 3D sensor.

As further described above, by way of background, a particular type of 3D sensor is a stereo camera head. As used herein a "stereo camera head" includes any system in which a plurality of 2D cameras are rigidly attached together and typically calibrated with respect to each other.

More generally, stereo matching entails locating of a feature in one image and then finding the same feature in one or more other images acquired from a different vantage point (which matched images can also be rectified and/or preprocessed). This is termed "corresponding" the feature between images. This correspondence is a particularly challenging task where the object defines a tessellating or repeating patterns (also termed the "correspondence problem"). A variety of techniques are available to those in the art for stereo matching such as the well-known Marr-Poggio-Grimson stereo algorithm. As will be described below, the correspondence procedure of the illustrative embodiment employs the detecting of zero-crossings in the filtered result to obtain the edges. This matching procedure is considered "sparse" because the procedure searches for points in which the confidence of a feature is high.

Note that each camera head 120, 122 and camera 140, 142, 144, 146 has been calibrated in advance of any runtime process. A variety of techniques familiar to those of ordinary skill can be used to accomplish calibration. In general, accurate 3D alignment in accordance with this invention requires an accurate mathematical model of each 3D sensor in the system. Camera calibration is the process of determining the mathematical model for a 3D sensor. Many techniques are known in the industry for calibrating (i.e. establishing the internal geometric and optical camera characteristics (intrinsic parameters) and the position and orientation of the camera relative to a defined world coordinate system (extrinsic parameters)) a 2D camera. The intrinsics and extrinsics are often referred to as camera calibration parameters. In an illustrative embodiment, for a stereo camera head, the camera calibration process is performed simultaneously on all the 2D cameras comprising the stereo camera head. This yields the most accurate mathematical model for the stereo camera head.

More particularly, the camera calibration involves modeling an image formation system by estimating the intrinsic parameters and the extrinsic parameters. The camera intrinsics and extrinsics (camera calibration parameters) are used in runtime to remove the lens distortion and interpret the observed 2D image feature points in a 3D space. The accuracy of camera calibration directly affects the performance of the system. One illustrative calibration procedure uses a planar calibration object (for example, a rectangular black and white checkerboard plate) presented at a number of different orientations within the viewing area (stage 149 in FIG. 1). Camera calibration estimates intrinsics and extrinsics from feature correspondences relating observed 2D image feature points and 3D features that are located on a planar surface. These image/physical feature correspondences can be determined using appropriate software tools within the vision system.

Accurate 3D alignment also requires knowing the relative poses of the 3D sensors in the system. The process of determining the relative poses of the 3D sensors in the system is known as world calibration. More specifically, world calibration consists of the process of determining the poses of all the 3D sensors (120, 122, 170) in the system (depicted camera coordinate systems 160 and 162, for example) relative to a world 3D coordinate space (herein depicted as the x, y and z coordinate system 164 oriented with respect to the stage 149). The particular orientation of the world 3D coordinates can be highly variable, but represents a single coordinate space or reference frame. Knowing the poses of all the 3D sensors in the world 3D coordinate space allows the 3D data from each sensor to be merged together. This merged data allows a more complete 3D point cloud of the object 110 to be obtained.

II. Model Training 3D alignment in accordance with the illustrative embodiments requires use of a mathematical model of the object 110. There are many ways to model an object, such as by use of a CAD model, surface model, wireframe model, point cloud, etc. The process of model training involves converting the user-specified model of the object into a form that is optimal for 3D alignment. More particularly, the output of model training is a mathematical model of the user-specified model object in a form readily consumable by various parts of the 3D alignment procedure in accordance with the illustrative embodiments. As will be described below, the model in this embodiment is specified, as a series of higher level geometric shapes (HLGS), such as line segments, curves, arcs, splines, and the like.

The illustrative 3D alignment algorithm operates based upon the resolvable edges of the object. Since edges are one-dimensional, a set of 1D curves embedded in 3D space can be used to model the edges of the object. It is not necessary to model every edge of the object. In fact, increasing the number of edges in the model typically increases the compute time for the 3D alignment, which reduces system effectiveness. It is desirable generally to model the minimum number of dominant edges of the object. The dominant edges are typically longer and higher-contrast edges on the object. The minimal number of edges must include those edges needed for disambiguating similar poses of the object. A variety of techniques can be used to provide the model HLGS data. In one embodiment, the HLGS can be synthesized from one or more acquired images of the object, using an automated or manual input of prominent 3D features (HLGS) image. In other embodiments, the features are entered manually or synthetically by providing physical measurements and coordinates for the various HLGS.

III. Runtime 3D Alignment Process

Having completed calibration and training of the system, the runtime alignment process can now be performed on an exemplary object 110. Reference is now made to the flow diagram 200 of FIG. 2, which shows the steps of the overall alignment process. This process 200 consists of a plurality of steps starting with the generation of a 3D point cloud from one or (typically) more 3D sensors located at various vantage points with respect to the object. The initial steps of acquiring simultaneous runtime images of the object (step 210) and rectifying/preprocessing those images (step 212) have been described above. The alignment or pose determination process for the runtime object is now described in further detail with reference generally to the steps of FIG. 2, with reference to step 220 in which a 3D point cloud of the object is generated using stereo matching.

A. Stereo Matching and 3D Point Cloud Generation

While embodiments of this invention expressly contemplate that other techniques for deriving 3D information from an imaged object, using alternate arrangements of cameras (for example trinocular camera heads) and/or other types of 3D sensors (LIDAR, etc.), the illustrative embodiment employs stereo matching processes. These processes are directed generally toward generating a cloud of 3D points sufficient to effectively align an object in accordance with this invention. In particular, the process of generating 3D points from depth images using stereo matching can be accomplished using a variety of techniques. These techniques are well understood by those of ordinary skill in the art. For further background, refer to, *Multiple View Geometry in Computer Vision* by Hartley and Zisserman or *An Invitation to 3-D Vision* by Ma, Soatto, Kosecka, and Sastry.

Where a plurality of stereo camera heads (120, 122, 170) are employed at each of a plurality of respective vantage points with respect to the object 110, the camera heads simultaneously acquire images of the object so as to avoid the possibility of imaging inaccuracy brought upon by movement of the object. The above-mentioned stereo matching process is performed to derive the 3D point cloud.

As described above, it should be clear, according to the various embodiments of this invention, that the use of one or more stereo camera heads to acquire 3D images of an object is one of a variety of imaging technologies that can be employed to acquire such three-dimensional image data. Thus, it is expressly contemplated that the above-described steps can be substituted or modified as needed to allow the generation of the desired 3D point cloud of the object using 3D sensors that operate according to differing technological principles to derive range data and/or produce depth images.

Figure 3:
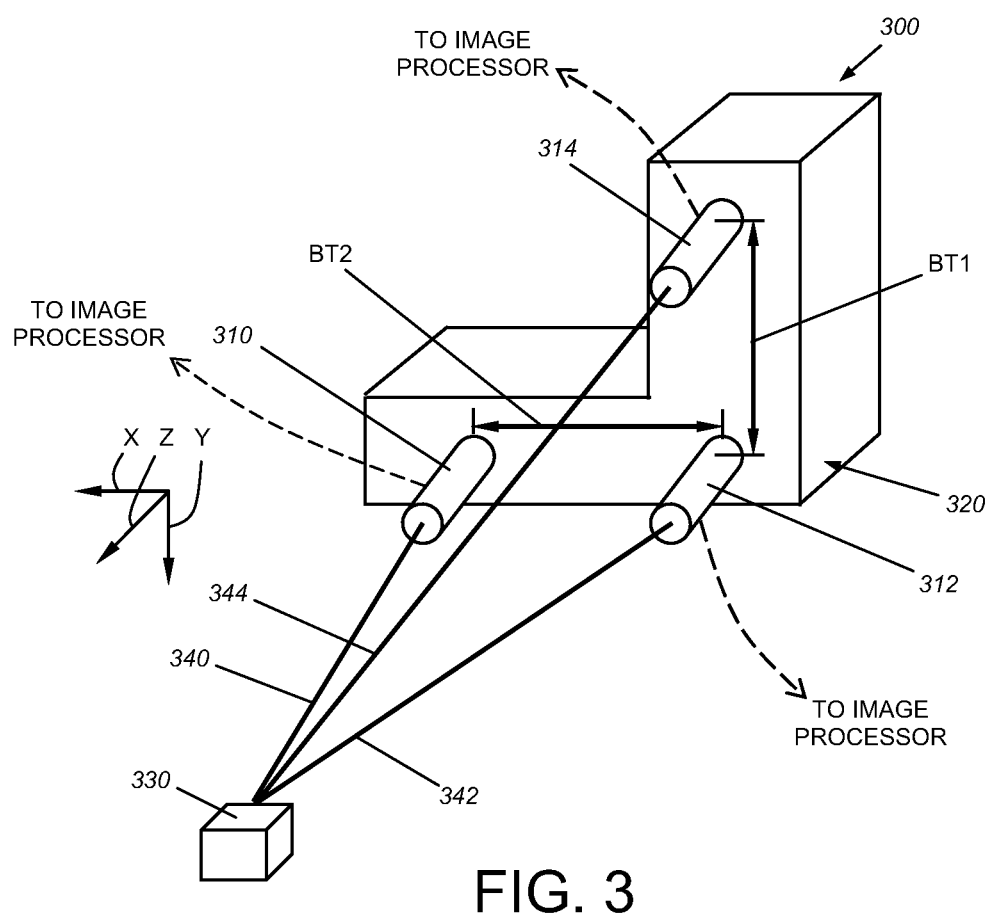
FIG. 3 is a perspective view of an exemplary trinocular stereo camera head for use in the system for determining the three-dimensional alignment of an object according to an embodiment of this invention.

Before further describing the alignment process 200 in detail, reference is made to FIG. 3, which illustrates a "trinocular" camera head/3D sensor 300 that can be employed according to an embodiment of this invention to reduce the occurrence of occlusions and blind edges in the acquired depth image of the object. This trinocular camera head 300 includes three cameras 310, 312 and 314. The cameras in this embodiment are arranged in an L configuration on a base housing 320 with a predetermined baseline BT1 and BT2 between camera 312 and cameras 314 and 310, respectively. Each of the cameras is operatively connected to the image processing device (130 in FIG. 1). Each camera 310, 312, 314 acquires a simultaneous image of the subject object 330 at a slightly different perspective as indicated by respective rays 340, 342, 344, and these images are combined by the image processor in accordance with mathematical techniques that can be similar to those described above to derive the 3D point cloud. In one embodiment, images in pairs of cameras in the trinocular camera head can be stereo-matched, and then the points can be mapped to the world 3D coordinate system, or in an alternate embodiment all three images can be matched at once using the appropriate algorithms into the world 3D coordinate system.

B. Extraction of Geometric Shapes from the Point Cloud

It is common for the 3D point cloud to have thousands, or even tens of thousands, of 3D points. To achieve the necessary speed and accuracy in performing alignment with current, commercially available computing devices, it is desirable to reduce the amount of data being processed. To reduce the amount of data processed by the system, the process 200 employs higher level geometric shapes (geometric shapes having higher dimensionality), or "HLGS", to perform 3D alignment (step 230). Since the points in the 3D point cloud of this embodiment correspond to the resolvable edges on the object, and since edges are one-dimensional geometric shapes, the process 200 extracts geometric shapes from the 3D point cloud having dimensionality greater than or equal to 1. The HLGS employed according to the embodiment described herein are 3D line segments, which are extracted from the 3D point cloud. The 3D line segment extraction process, described further below, searches through the 3D point cloud, looking for sets of collinear 3D points. Each set of collinear 3D points determines a 3D line segment. Once the set of 3D line segments has been determined, the set is pruned to remove duplicate or nearly duplicate 3D line segments. In other illustrative embodiments, the extraction process can extract any acceptable HLGS features (including combinations of different types of HLGS), such as line segments, edgelets, arcs, splines, etc. For example, the process in an illustrative embodiment can extract HLGS that include one-dimensional geometric shapes, both line segments and non-straight curves from the 3D point cloud.

Figure 4:
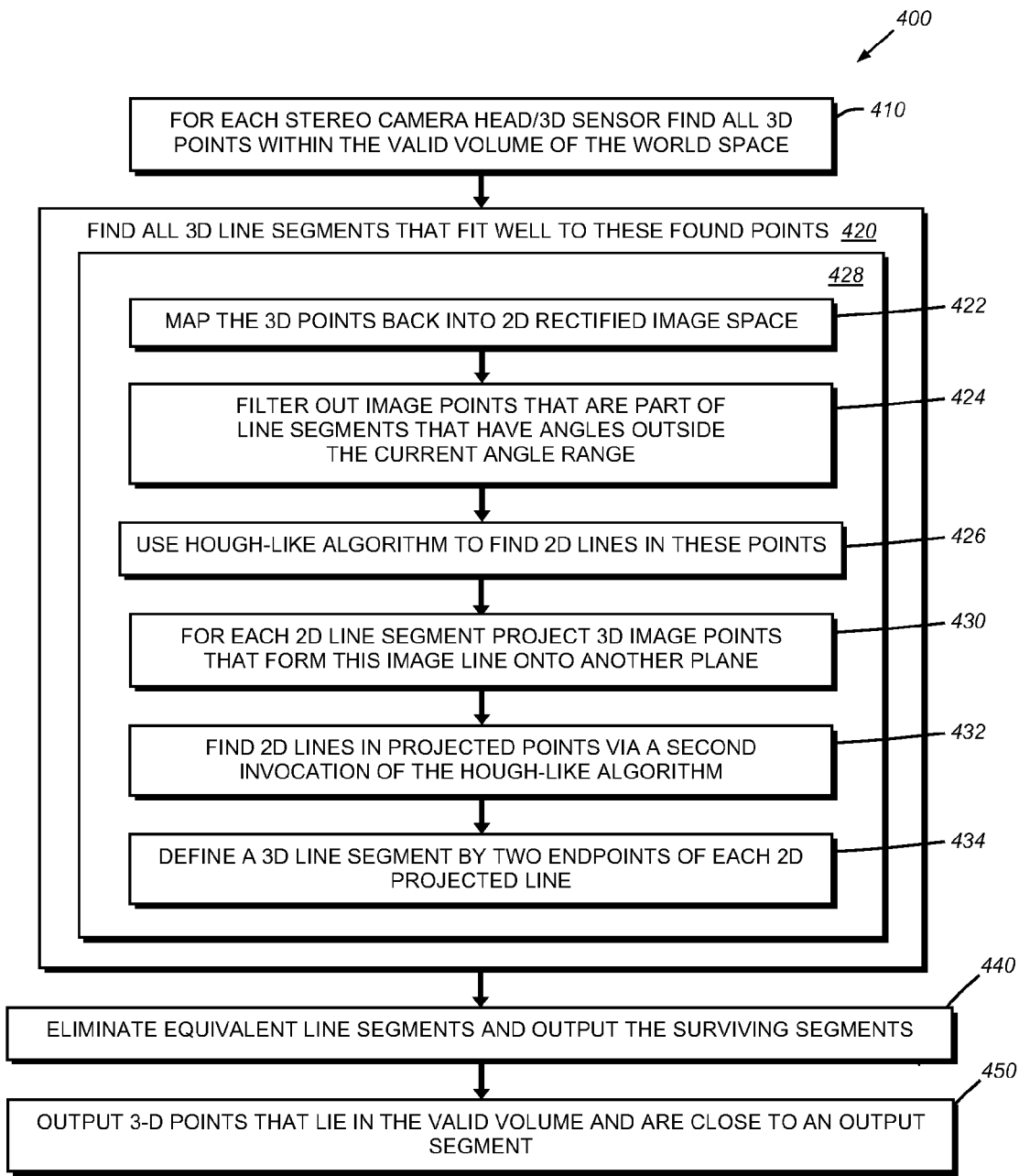
FIG. 4 is a flow diagram of an HGLS finding process according to an illustrative embodiment in which line segments are employed as the HLGS features.
Figure 5:
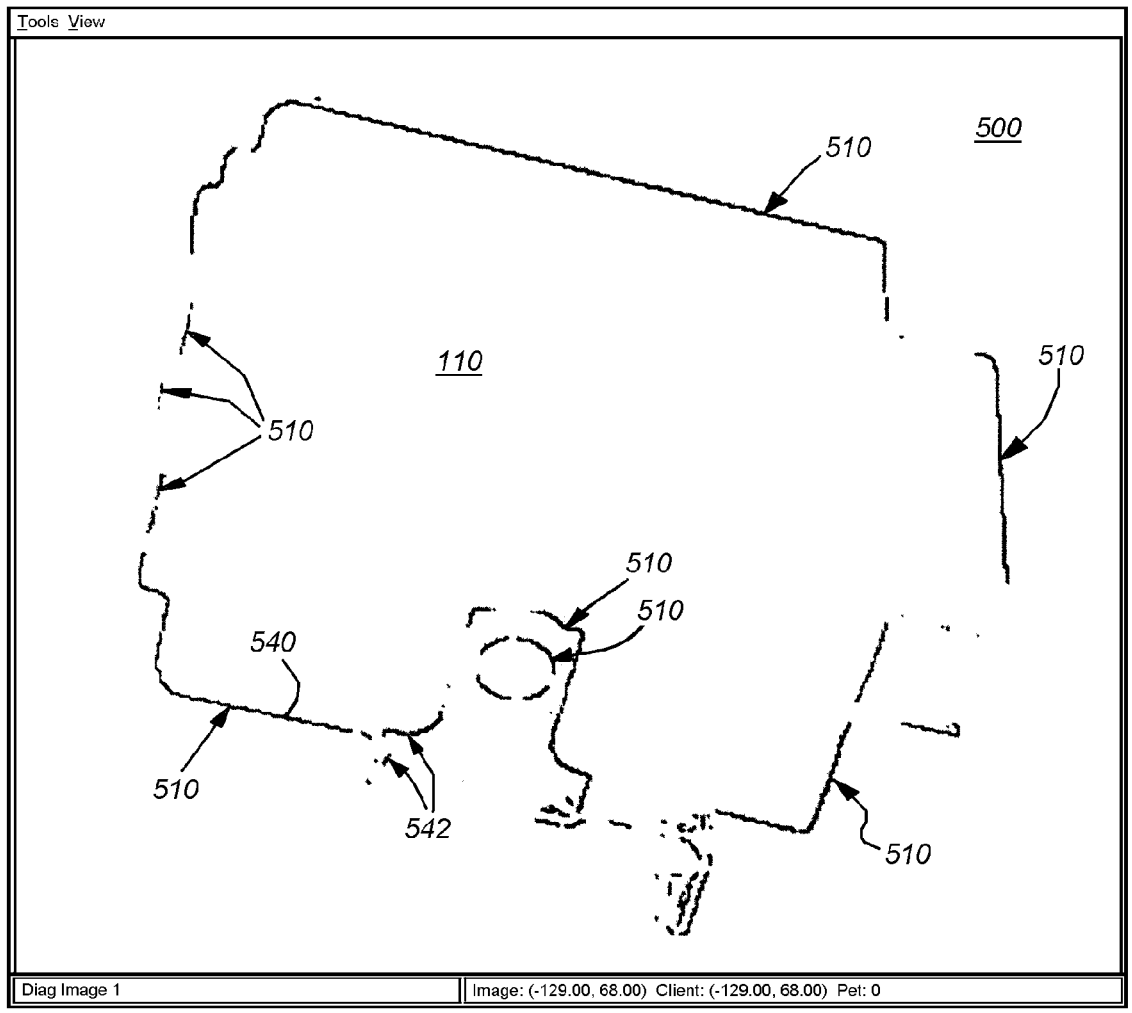
FIG. 5 is a screenshot of an acquired runtime image of an exemplary object showing line segments to be found by the finding process of FIG. 4.

For each stereo camera head (120, 122, 170), or camera pair, the process 200 (step 230) generates 3D line segments that fit the found 3-D world points in the point cloud. The lines are found for each stereo camera head and/or camera pair in a multi-step process 400 depicted in the flow diagram of FIG. 4. First, world 3D points are found as described above (step 410). Next the line segment finding process is performed in accordance with this embodiment and as described with reference generally to FIG. 4 by finding all 3D line segments that fit within the valid volume of the world space (step 420). All of the 3D points from a single stereo head are initially projected back into the 2D rectified image plane of one of the pair of cameras in step 422. The 2D points are known as 2D image points. A typical set of 2D image points 510 is shown below with reference to the vision system screenshot 500 of the object 110 (FIG. 5). The points 510 represent the non-zero pixels that are located throughout the depth image. These 2D points are not located about randomly, but follow resolvable object edges in the scene. They form thin (one or two pixel wide) threads of connected pixels in the back-projected image.

Figure 6:
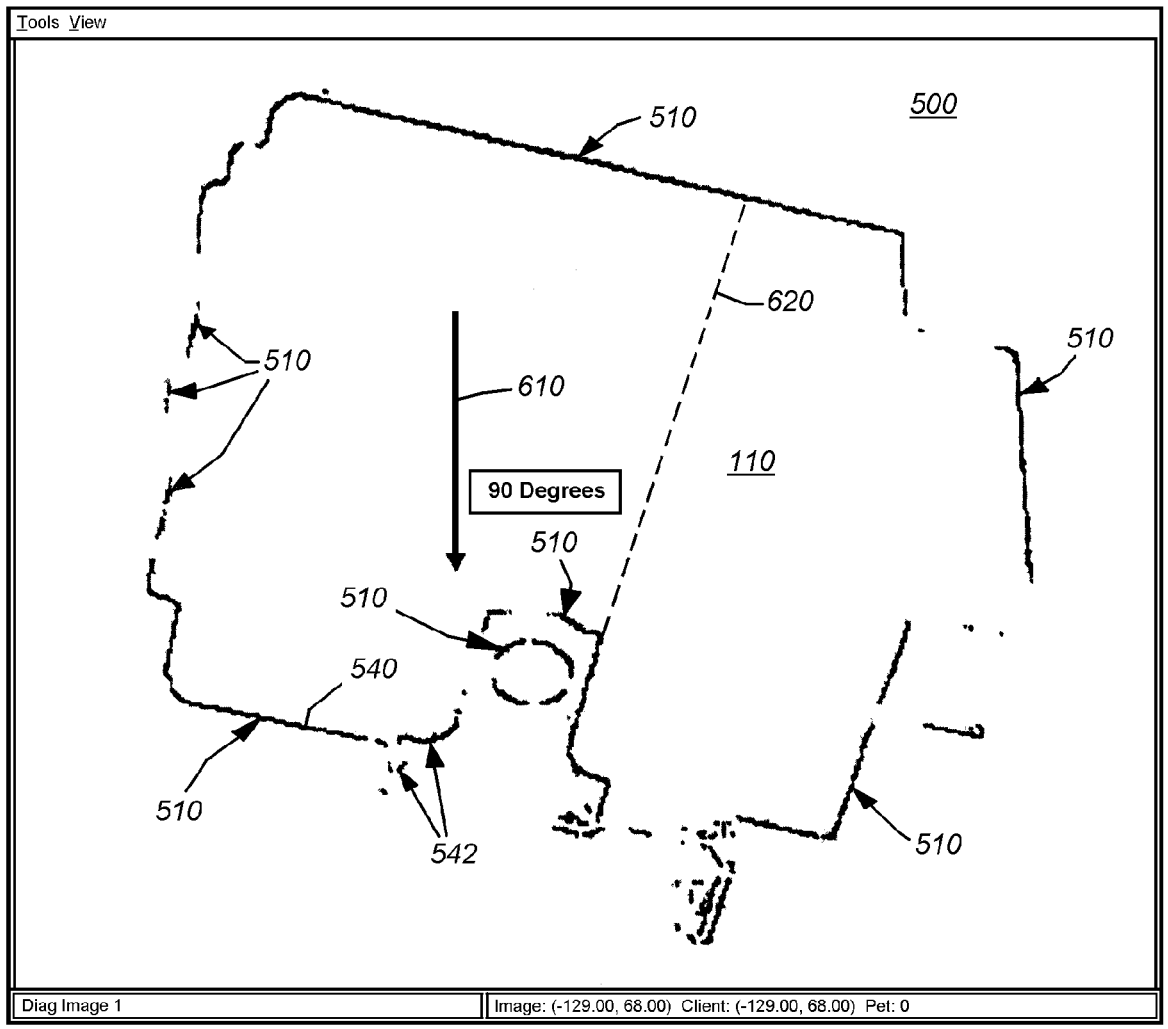
FIG. 6 is a screenshot of the acquired runtime image of an exemplary object FIG. 5 showing a 90-degree orientation with respect to the line segments and a potentially problematic line segment for use with the finding process of FIG. 4.

The next step is to iterate over the set of back-projected images and for each back-projected image iterate over a range of angles. The processing performed within each iteration is first pre-processing the back-projected image for the current angle range and then passing it into the below-described 2D line finding tool. The set of 2D image points in the current back-projected image is filtered so as to remove any 2D image points contributing to a line segment with an orientation outside the current angle range (step 424). This prevents the below-described 2D line finding tool from combining 2D points from unrelated lines into one line. For example, the dashed line segment 620 (FIG. 6) is a typical case. Here the tool may aggressively include some points referenced by the top of 620 that are not part of the line segment referenced by the bottom of 620. The 2D point preprocessing step 424 eliminates such unrelated points.

Next, the remaining 2D points, are used as an input to a commercially available vision system tool for finding 2D lines (step 426). The tool in an exemplary embodiment can be a so-called "PAL tool", available from Cognex Corporation of Natick, Mass. This tool is described more fully, by way of useful background, in commonly assigned U.S. Pat. No. 6,075,881, entitled MACHINE VISION METHODS FOR IDENTIFYING COLLINEAR SETS OF POINTS FROM AN IMAGE, the teachings of which are expressly incorporated herein by reference. This tool is similar in function and implementation to the Hough line-finding technique and has been used to analyze images of ball grid arrays. By way of further background, refer to U.S. Pat. No. 6,151,406, entitled METHOD AND APPARATUS FOR LOCATING BALL GRID ARRAY PACKAGES FROM TWO-DIMENSIONAL IMAGE DATA, the teachings of which are expressly incorporated herein by reference.

The line segment finding tool first searches a range of angles in the 2D plane to find the angle that corresponds to the densest line in the image (within that range). It then identifies all the lines that occur at that angle. The densest line is the one that is "close" to the greatest number of 2D points. Since image lines might occur at several different angles within the depth image, the tool can be run multiple times—with each run covering a unique 15-degree range. Lines whose angle falls near the end of one range (and therefore near the beginning of the next range) are generally not counted twice. Any time the strongest angle within a 15-degree range is within 10 degrees of the strongest angle in a neighboring range only one of the two is kept, namely the angle corresponding to the densest line. For all surviving angles the PAL tool is used to find the 2D lines that correspond to that angle.

Each 2D image line segment is processed further to extract a final set of 3D line segments in accordance with steps 430, 432, 434, which are part of the iterative process indicated by box 428. The first processing step is to shorten any line segments that have "sparse" ends. As shown in the screenshot 500 (FIGS. 5 and 6) the line segments produced by PAL (for example line 540) sometimes span distances of empty space to reach a small grouping of final points (for example points 542) that may not belong to that line segment. These sparsely populated ends are removed. The removal of sparse ends of line segments can occur as follows:

1. the N 2D points of the line segment are sorted according to their distance along the segment. In this example the first element of the list has a distance of zero, and the Nth has a distance of L, which corresponds to the total length of the segment;
2. if the distance of the (0.1*N)th element is greater than 0.2*L then the starting end of the segment is deemed to be sparse because more than 20% (the threshold used in this example) of the segment's initial length is covered by only 10% of the 2D points;
3. the other end of the segment is declared sparse if the (0.9*N)th element has a distance less than 0.8*L; and
4. any end that's called sparse is trimmed by analyzing the distances between consecutive 2D points in the sparse portion of the sorted list (i.e. the 0.1*N points at the sparse end). The segment is clipped at the innermost inter-point gap that exceeds the average gap of the sparse points.

After clipping, the 3D points corresponding to the surviving 2D points in each 2D image line segment are projected into a new plane for further processing (step 430). This step is illustratively employed to handle the case where two or more 3D line segments projected onto the same 2D line segment in the back-projected image. The new plane can be defined by three 3D points, which include the camera origin of the (right, in this example) camera 140, and the two 3D points that correspond to the endpoints of the 2D image line segment. By definition the new plane is different for each 2D image line segment and substantially perpendicular to the plane of the back-projected image. The 3D points lie very close to the new plane. After projection, the resulting 2D points are known as the projected points.

Next the PAL tool is again used to find 2D line segments that fit the projected points (step 432). Alternatively, a Hough-like algorithm can be employed to find 2D line segments in a manner clear to those of ordinary skill. The algorithm is operated similarly to that described in step 426 above. However, the projected 2D points are not filtered as described above in this step of the embodiment. The PAL tool is run in 15-degree angle ranges to find 2D lines in this embodiment.

Once the projected 2D line segments have been found, and clipped, they are converted to 3D line segments in step 434. This is accomplished in the embodiment by (a) identifying the two 3D points that correspond to the endpoints of the projected 2D line segment; (b) verifying that these points are more than a predetermined length threshold apart (in this example line segments less than 1 cm are rejected); and creating a 3D line segment using the two 3D endpoints.

As described above, the 3D line segments are generated separately for each stereo camera head 120, 122, 170 (or other type of 3D sensor) in this embodiment. According to step 440, if a plurality of stereo camera heads/3D sensors is employed, each at discrete vantage points with respect to the object 110 and stage 149, then it is likely that some of the 3D line segments from one camera head will correspond to the same physical feature as segments from one or more other camera heads. If two or more 3D segments are substantially equivalent then the process 400 eliminates all but one of the segments. Note, it is contemplated that two or more 3D line segments (or other HLGS) can be substantially equivalent or identical, or otherwise close to each other. In such cases, the process 400 can merge these line segments, averaging or otherwise combining their values into a single value that is defined as a new line segment for use in the process, according to an alternate embodiment. In an illustrative embodiment, the retained segment is the one that has the most points. The equivalency of two 3D line segments can be judged by the process if either line is mostly contained within a small cylindrical space around the other line. The radius of the imaginary cylinder is a user-supplied parameter, as is the definition of mostly. A fractional value (for example, between 0.5 and 1.0) can be used by users to specify how much of the equivalent segment must reside within the cylinder of the other segment against which it is compared. For example, a fraction of 0.8 indicates that at least 80% of the length of one line segment must fall within the imaginary cylinder surrounding of the other line segment. It is expressly contemplated that other techniques can be employed to determine and eliminate equivalent line segments.

The last step 450 in the illustrative line segment finding process 400 is to identify all of the 3D points from any stereo camera head/3D sensor that are close to any of the final 3-D line segments after line-segment elimination in step 440. In this embodiment, step 450 is accomplished by iteration over all of the final line segments and all of the 3D points. In various embodiments techniques can be applied to enter a close point to only one line segment or another if the point is close to more than one line segment. Otherwise, the point can be added to both line segments. At this step in the process, the results of all 3D sensors are combined and ready to be scored so as to locate a high-scoring candidate 3D pose, representative the object's six-degree-of-freedom 3D alignment. Note that the term "high-scoring" as used herein can refer to one or more candidate 3D poses that achieve a score during the scoring process that is sufficiently high to be usable as an acceptable alignment solution for the one or more objects in the scene that is the subject of the 3D sensor's 3D representation. In fact a high-scoring pose can be a best, highest, or top-scoring pose of a group of candidate 3D poses or can be one that provides other acceptable characteristics. A high-scoring pose or poses can be derived at each step of a multi-step (e.g. coarse, fine, etc.) scoring process, with a one (or more) high-scoring pose being employed at the end of the 3D alignment process as the solution.

It should also be clear to those of ordinary skill that the above-described line segment finding process can be replaced with other line segment finding processes and other types of HLGS. Thus, the use of line segments as the HLGS in this embodiment is only by way of example.

C. Generation and Scoring of Candidate Poses

Figure 2:
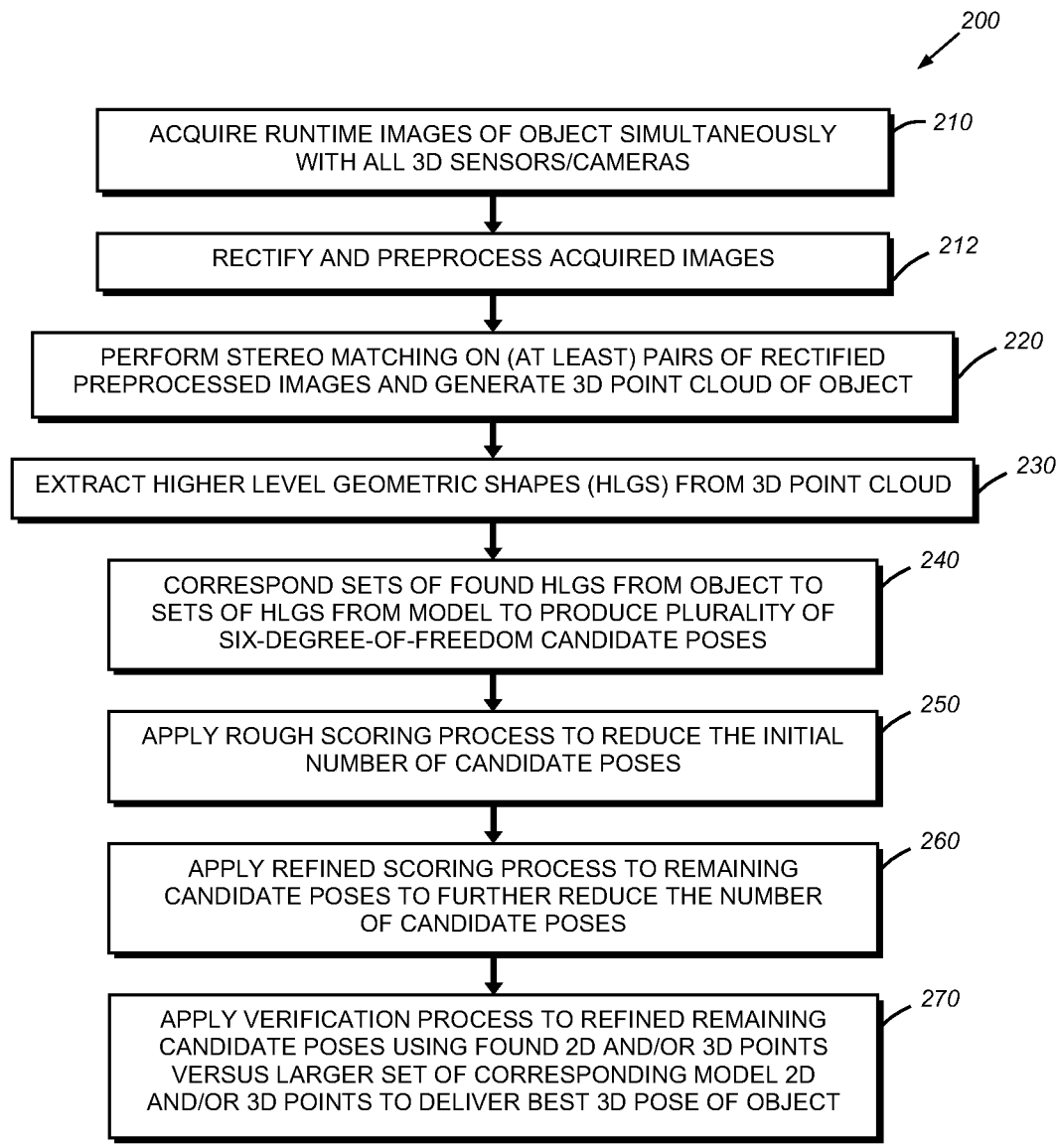
FIG. 2 is a flow diagram of the overall three-dimensional pose determination process according to an illustrative embodiment of the invention.

Referring again to the main alignment process 200 of FIG. 2 of this embodiment, once a final set of found line segments (or other types of HLGS) are extracted they are then corresponded to a pair of model, non-parallel 3D line segments. Where other types of HGLS are employed, the correspondence can be of larger or smaller groups than pairs. In many embodiments, the use of one-dimensional geometric shapes (non-straight curves and/or line segments) is the basis for correspondence. Likewise, the sets of found HLGS that are combined for correspondence to a model set can differ in orientation for reasons other than being non-parallel (e.g. corresponding found pairs of non-straight curves located at a predetermined 3D spacing from each other with non-straight model curves at predetermined spacing ranges). Each such correspondence may produce a group of six-degree-of-freedom "candidate poses". For robustness, all possible combinations of found line segment pairings and model line segment pairings are tried in accordance with step 240. Trying all these possible combinations can yield millions of candidate poses. To increase the speed and efficiency of the process 200, rapid scoring techniques are employed to prune the set of candidate poses down to more reasonable size. At which point, more sophisticated scoring can be performed.

Figure 7:
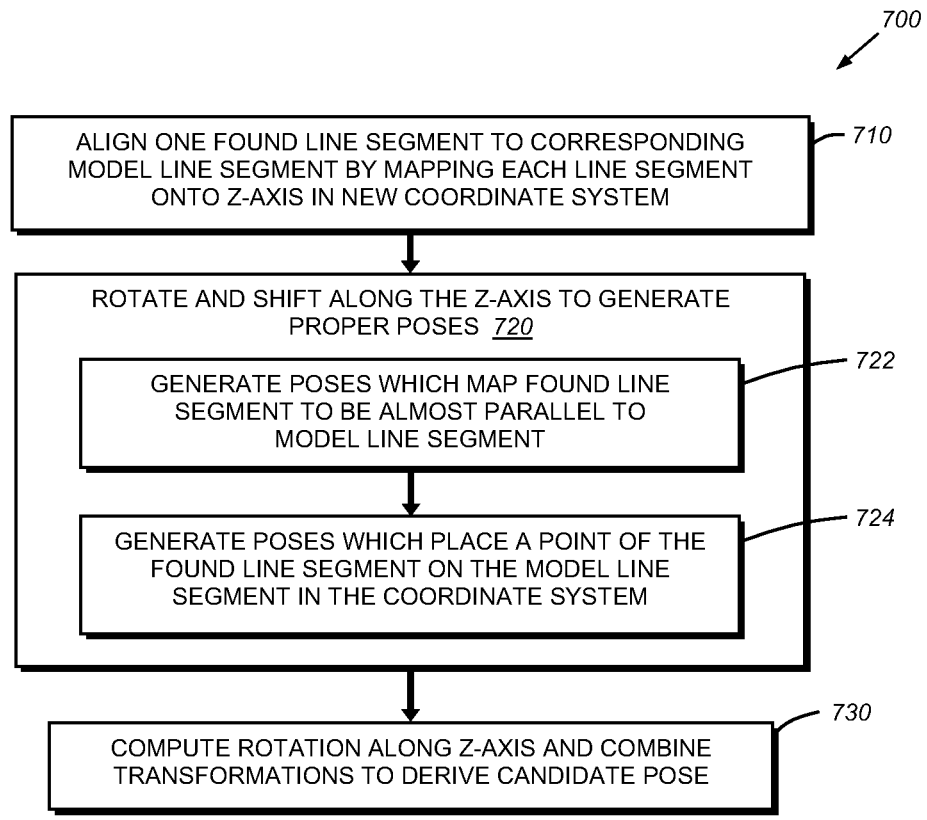
FIG. 7 is a flow diagram of a candidate 3D pose generation process in accordance with an illustrative embodiment.
Figure 8:
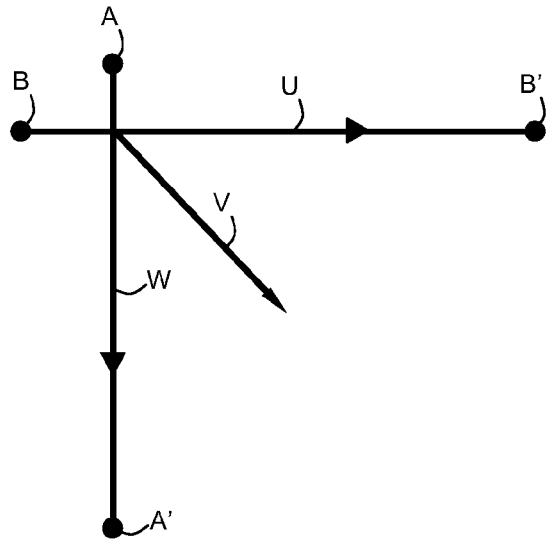
FIGS. 8-15 are graphical diagrams describing the establishment and determination of candidate poses from exemplary model and found HLGS each defining non-parallel pairs of line segments in this embodiment.
Figure 9:
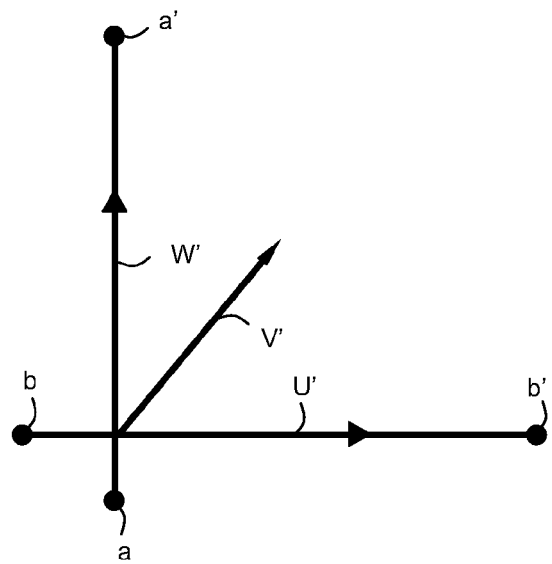

By way of further description, a discussion of candidate 3D pose determination is now provided with reference to the flow diagram of FIG. 7. The pose determination process 700 begins with step 710, in which a 3D found line segment is aligned with a corresponding 3D model line segment by mapping both line segments into the same coordinate system (for example the 3D world coordinate system). Reference is made to the geometric diagrams of FIG. 7-FIG. 15, which describe the various steps employed in generating a candidate pose from a pair of non-parallel model line segments denoted by respective endpoints A and A' and endpoints B and B' (model line pair AA' and BB') and found line segments, endpoints a and a' and endpoints b and b' (found line pairs aa' and bb'). An example of the model line pairs AA' and BB' are represented in FIG. 8, and lie upon the axes W and U of an associated 3D orthogonal coordinate system (U, W, V). Likewise, an example of the found line pairs aa' and bb' are represented in FIG. 9 as respectively lying upon axes W' and U' of an associated orthogonal coordinate system U', W', V'.

For the model non-parallel 3D line pair (AA' and BB'), and the found non-parallel 3D line pair (aa' and bb'), as shown above, up to four groups of poses can be generated to map the found line pair to the model line pair, namely: Group 1, based on first mapping directed line aa' to directed line AA'; Group 2, based on first mapping directed line aa' to directed line A'A; Group 3, based on first mapping directed line bb' to directed line BB'; and Group 4, based on first mapping directed line bb' to directed line B'B. In the following description of the pose determination process, Group 1 will be used as an example of the steps of the process 700. The process, thus constructs three orthogonal-normal vectors (U, W, and V) based on the pair of line segments, in which U is normalized $A_2B_2$.

Where $B_2=(B+B')/2$ (the midpoint of line segment BB')

$A_2=A+((AB_2)$ dot-product $(AA'))AA'/(|AA'|*|AA'|)$ (this is the projection of point $B_2$ onto $AA'$ W is normalized ($A_2A'$)

V is the cross product of W and U.

Figure 10:
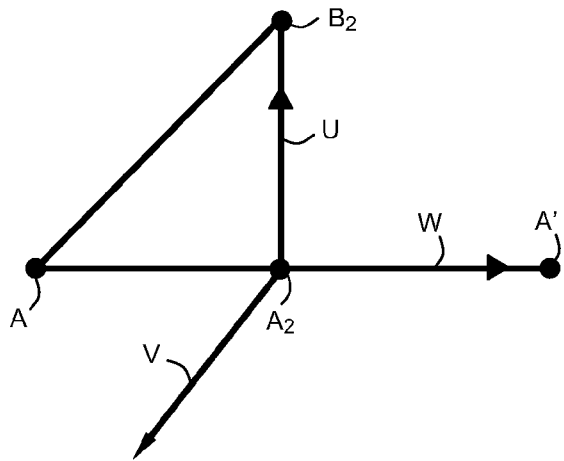

$A_2$ is the origin for the new coordinate system defined by U, W and V as shown in FIG. 10.

In this case, the translate amount is $-A_2$, i.e., translation matrix $T_1$ is based on $-A_2$, and the rotation matrix is defined by:

$$M_1 = \begin{bmatrix} U \\ W \\ V \end{bmatrix}$$

Since U, W and V are orthogonal-normal vectors, $M_1\_inverse = M_1^T = [U\ W\ V]$ Similarly, three orthogonal-normal vectors based on the pair of found line segments can be constructed: (U', W', V').

$$M_2 = \begin{bmatrix} U' \\ W' \\ V' \end{bmatrix}$$

$M_2\_inverse = [\ U',\ W',\ V'\ ]$ $T_2$ is based on $-A_2$.

After applying $M_1*T_1$ to the pair of model line segments AA' and BB', and applying $M_2*T_2$ to the pair of found line segments, mapped AA' and mapped aa' are both on the z axis of the new coordinate system.

The next step of the process 700 is to rotate and shift along the z axis to generate proper poses (step 720). This includes the step of generating poses which map the found line bb' to be almost parallel to model line BB' (step 722).

The point $P_1(x_1, y_1, z_1)$ on line BB' which has the shortest distance to z axis can be obtained. Assume that point $P_0$ is the projection of point $P_1$ on z axis, and it has coordinate $(0, 0, z_1)$, then line $P_0P_1$ is perpendicular to both line BB' and z axis.

Figure 11:
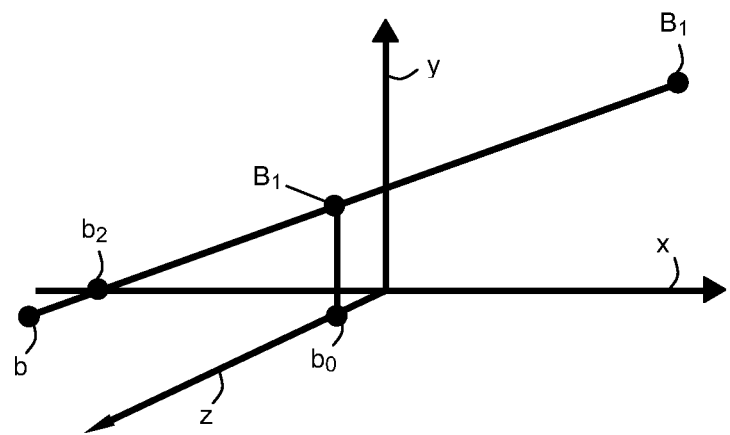

In accordance with FIG. 11 point $b_2$ is shown after applying transformation $M_2*T_2$, and it is on x axis in the new coordinate system.

A point $b_1$ on line bb' and a point $b_0$ on z axis can be found in a similar way as finding point $P_1$ and point $P_0$ using model line segments. Point $b_0$ has the same z value as point $b_1$, and $b_0b_1$ is perpendicular to both line bb' and z axis. Assume that point $b_1$ has coordinate $(x_{b1}, y_{b1}, z_{b1})$, and point $b_0$ has coordinate $(0, 0, z_{b1})$. The next step is to move point $b_1$ to a location $b_{1\_new}$ on line $P_0P_1$ by rotating and translation along z axis.

If $(|P_0P_1|>0)$ and $(|b_0b_1|>0)$ then

Figure 12:
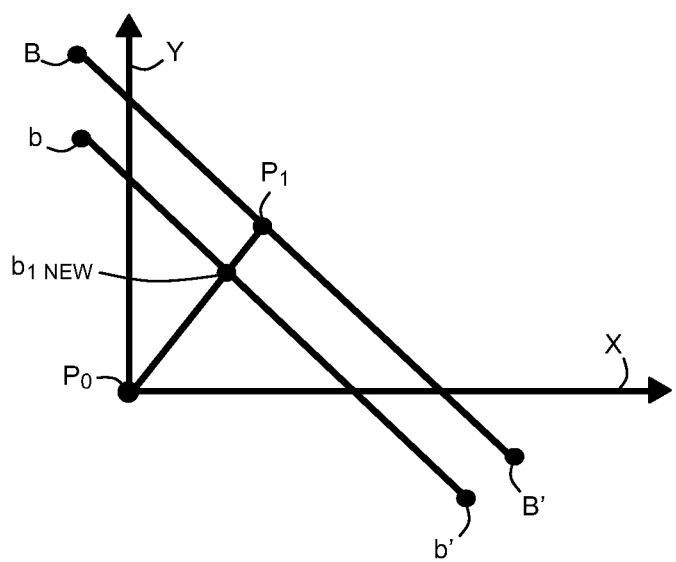

If fabs$(|P_0P_1|-|b_0b_1|)<$distanceTolerance, then $b_{1\_new}$ has coordinate $(x_1*|b_0b_1|/|P_0P_1|,\ y_1*|b_0b_1|/|P_0P_1|,\ z_1)$ Since $b_{1\_new}$ is on the line $P_0P_1$, this movement will generate a candidate pose (using step 730 described below) where the transformed found line bb' is parallel to model line BB' after projection them onto XY plane (as shown in FIG. 12).

Figure 13:
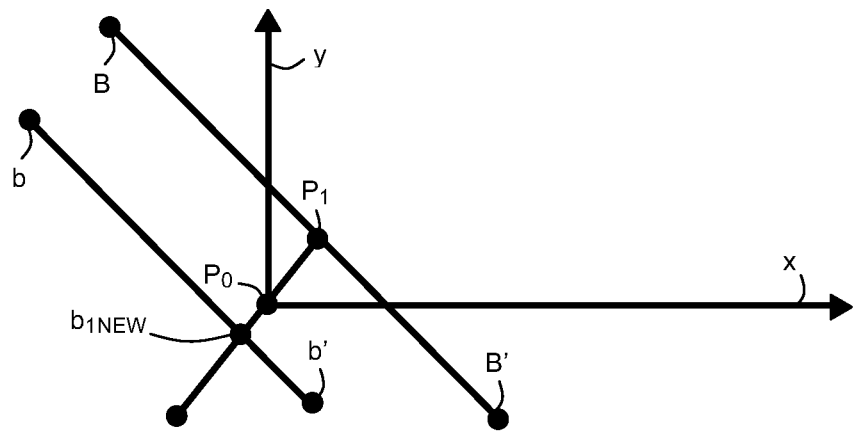

If fabs$(|P_0P_1|+|b_0b_1|)<$distanceTolerance, there is another $b_{1\_new}$ location: $(-x_1*(|b_0b_1|/|P_0P_1|),\ -y_1*(|b_0b_1|/|P_0P_1|), z_1)$, as shown in FIG. 13.

If$(|P_0P_1|==0)$ (i.e., line BB' has intersection with z axis in the new coordinate system. Since $B_2$ is also on line BB, and $B_2$ is on x axis, line BB' is on XZ plane.), then if $(|b_0b_1|<$distanceTolerance) then There are two locations for point $b_{1\_new}$ (they are the same if $|b_0b_1|==0$).

One location is $(0, |b_0b_1|, z_1)$

Figure 14:
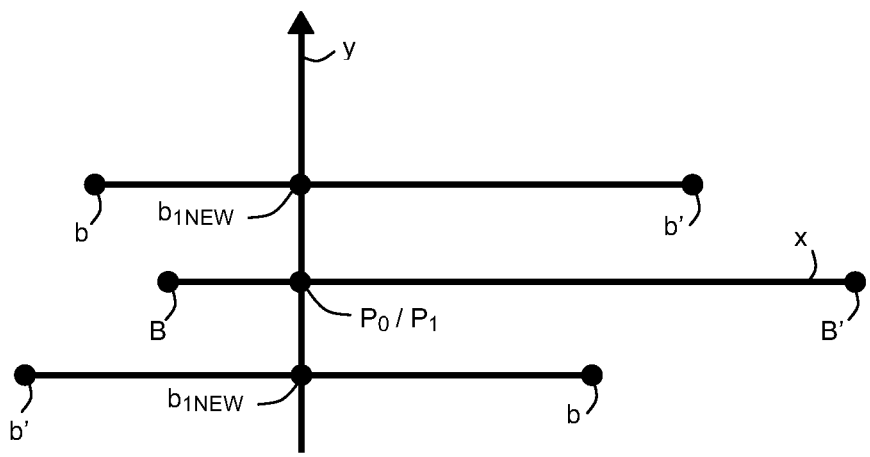

Another location is $(0, -|b_0b_1|, z_1)$. These two discrete locations are shown in FIG. 14.

If $(|P_0P_1|>0)$, but $(|b_0b_1|==0)$ then

Figure 15:
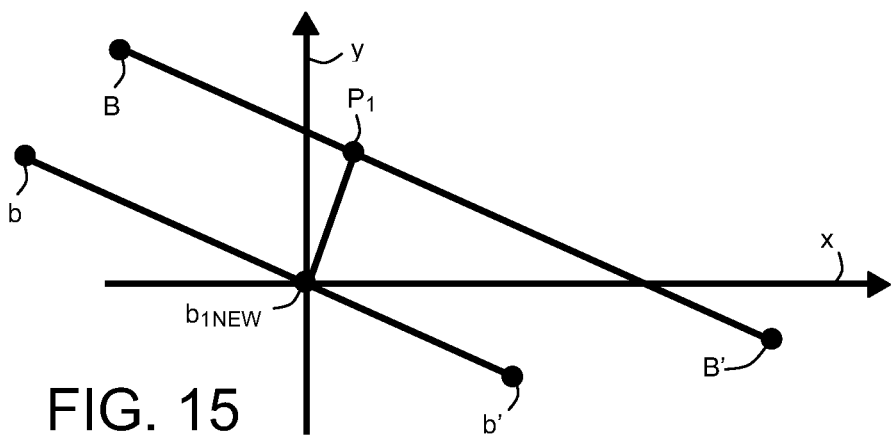

The rotation angle along z axis can be decided by vector B→B' and vector b→b'. Projecting these two vectors to XY plane, the rotation renders the projected vector (b→b') parallel to the projected vector (B→B'). This orientation is shown in FIG. 15.

Next, in accordance with the candidate pose determination process 700, poses are generated, which place the point $b_2$ (from the found line segment bb') on the line BB' in the new coordinate system (step 724). In this case, it is assumed that $b_2$ has coordinate $(x_b, y_b, z_b)$ in the new coordinate system (where line aa' and vector W' are positioned along the z axis). Assume that the distance from point $b_2$ to z axis is d, and the shortest distance from line BB' to z axis is D. After rotating and translating along z axis, the distance from the mapped $b_2$ to z axis should be still d.

If d<D, then there is no solution to move $b_2$ to line BB' by rotating and translating along z axis. If the following distance is within the threshold, (D−d)<distanceTolerance, then the proper pose can be generated using process step 722 described above, which places line bb' almost parallel to line BB' after mapping. In this case, no new pose has been generated.

If d is almost equal to D, then there is one solution. If d>D, then there are two solutions. i.e., there are two points on line BB' which has the same distance as d to z axis.

From each new location of $b_2$, the corresponding pose can be obtained by step 730, now described. In this step, the rotation along the z-axis is computed and transformations are combined to derive the appropriate candidate pose.

In this case, it is assumed that it required to transform point P(x, y, z) to point $P_{new}(x_{new}, y_{new}, z_{new})$ by a rotation along z axis and a translation. The transformation can be written as follows:

$M_3 = M_t * M_r$

First, $M_t$ transforming P(x, y, z) to $P_m(x_{new}, y_{new}, z)$ can be solved since there is only 2 variables ($\cos\theta$ and $\sin\theta$) in the rotation matrix for rotation along z axis only, and there is also the following constrain:

$x*x + y*y = x_{new}*x_{new} + y_{new}*y_{new}$

The translation $M_t$ is based on vector $(0, 0, z_{new}-z)$.

Then, finally, combining all the transformations together, each appropriate candidate pose (the transform from the model line segments to the found line segments) is obtained as follows:

$T_1\_inverse * M_1\_inverse * M_3\_inverse * M_2 * T_2$.

Figure 16:
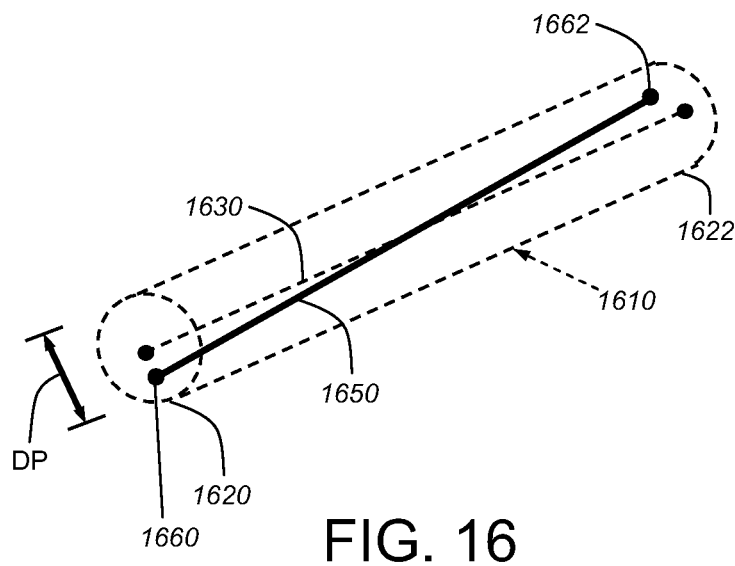
FIG. 16 is a perspective diagram of an illustrative pipe, taken about a model line segment and the correspondence of an exemplary found line segment thereto, wherein the found line segment is retained in a coarse scoring process.
Figure 17:
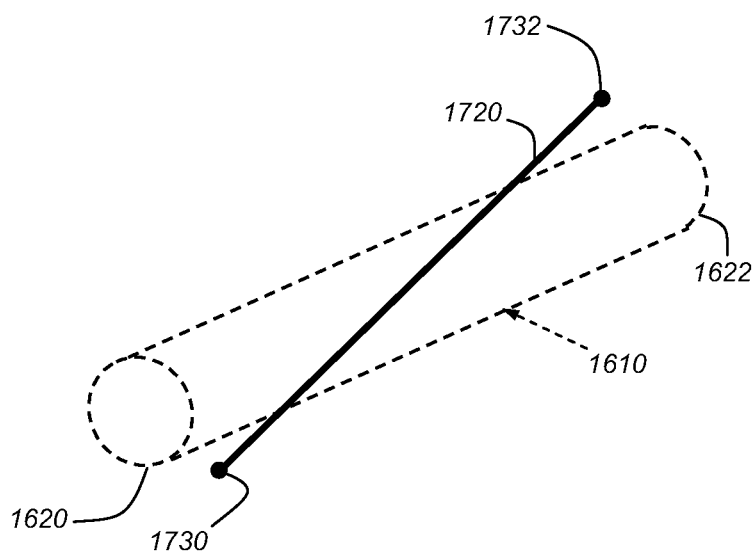
FIG. 17 is a perspective diagram of the illustrative pipe of the model line segment of FIG. 16 showing an exemplary found line segment that that diverges from the pipe, and is thereby discarded in the coarse scoring process.

More generally and as discussed above, and in connection with step 250 of the overall process 200 (FIG. 2), an efficient technique to coarsely (and relatively rapidly) score all candidate poses derived above so as to prune the number of possible candidate poses to a number reasonably handled by the process can employ the general technique of defining geometric "pipes" of a given tolerance around model line segments. When all, or a predetermined (and potentially substantial) proportion, of the endpoints of the found line segments reside within a pipe, the candidate pose between the model and found line segments is retained for refined scoring. When a predetermined proportion (for example, one or more) endpoints diverge from the pipe, the candidate is discarded. The principle is shown graphically in FIGS. 16 and 17. As shown in FIG. 16, the model line segment (dashed line 1630) is surrounded by an imaginary "pipe" 1610 (shown in phantom) having a pair of endpoints 1620, 1622 and a predetermined tolerance diameter DP. Of course, a variety of pipe cross sections (e.g. square, polygon, circle, oval, etc.) can be employed to define the pipe. A found line segment 1650 resides within the pipe. The found line segment 1650 includes opposing endpoints 1660, 1662 that match-up generally with the ends 1620, 1622 of the pipe 1610. There is depicted some skew between the found line segment 1650 and model line segment 1630—however, the runtime line segment 1650 is still contained fully within the pipe 1610. This feature is within tolerance, and therefore provides an acceptable part of an overall candidate pose. Conversely, as shown in FIG. 17, the endpoints 1730, 1732 of the second found line segment 1720 exit the pipe 1610, and thereby indicates an unacceptable candidate pose.

In order to efficiently check whether a mapped 3D point is inside a model line pipe, lookup tables with requisite data can be precomputed. Note that the pipe's cross section can be defined as a rectangle in illustrative embodiments, and its size can depend upon the user/system-specified distance tolerances. Such illustrative lookup tables can assist in checking whether a subject point is inside a model line segment's tolerance range, and can also be used to return the identifiers (IDs) of each model line segment with a distance from the point that is inside the tolerance range. The use of such lookup tables is described with reference to the scoring of candidate poses generated in accordance with the above-described candidate pose determination process 700.

Coarse (i.e. fast or rapid) scoring processes can effectively prune the set of candidate poses down to a size that can be reasonably handled by the processor. At which point, more-processor-intensive fine scoring can be applied to the pruned set of candidates in accordance with steps 260 and 270 so as to generate the final pose or alignment of the object 110. Note that while an illustrative embodiment contemplates a two-step, coarse and fine scoring process these scoring steps can be combined into a single scoring process that is termed generally as the "scoring process." Likewise, the scoring process can consist of a multiplicity (3 or more) scoring steps of similar or varying computational/processing overhead. Thus, the term scoring process can refer generally to a process that contains 1–N discrete scoring steps. Moreover, there are a variety of alternative, or overlapping processes that enable coarse(rapid) and fine (refined) scoring, some of which are described in further detail below:

1. Scoring Using Endpoints of the Found 3D Line Pair

This scoring process is applied for each pose generated by a pair of found lines and a pair of model lines. The score is the number of end points of the pair of found lines inside the model line pipes (described above) after mapping based on the pose generated from this pair of found lines.

If this score is less than 4—in this example implying that at least one end point of the pair of found lines is not inside the model line pipes after mapping using the given pose—then the pose generated is discarded immediately. This technique can be used as the coarse scoring as described above.

2. Scoring Using Endpoints of All Found 3D Lines

In this scoring process, the score is defined as follows score=Σlength(line(i))

where, for each found line(i), the two end points of line(i) are inside the same model line pipe after mapping using the given pose. This technique can be an initial part of the refined scoring process after pruning the candidate poses as described below.

3. Scoring Using all Found 3D Points

In this scoring process, the variable, NumInPipes=number of found 3D points inside the model line segments' pipes after mapping using the given pose. The variable, NumInInterior=number of found 3D points inside the part body' interior after mapping using given pose. The score is thus defined as Score=NumInPipes−4*NumInInterior.

In accordance with this illustrative scoring process, 3D points found in the interior of the part negatively impact the score. This process can be used for refined scoring of lines after coarse scoring to prune the number of candidate poses/line segments, in accordance with the overall scoring process described further below.

4. Scoring Using Model Coverage Score

Figure 18:
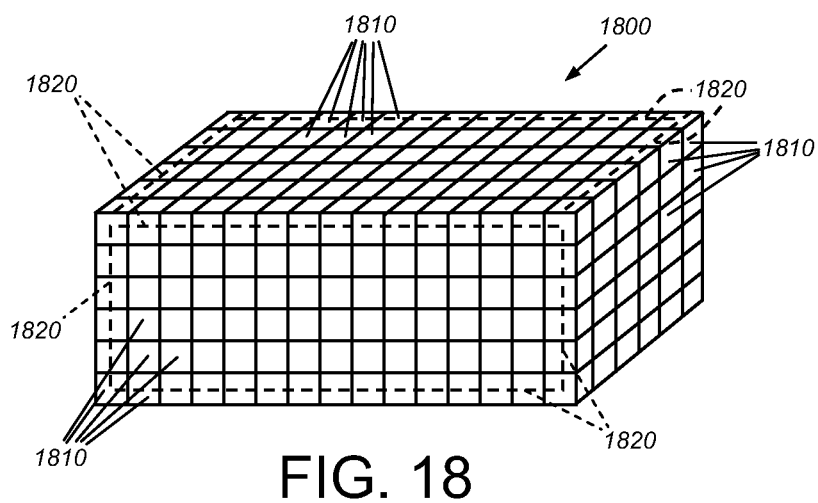
FIG. 18 is a perspective diagram of a three-dimensional space defining a look-up table divided into contiguous bins for determining a model coverage score used in refining the score of each candidate pose.

As used in the overall scoring process described in further detail below, the model coverage score represents the percentage of the model segments which are covered by the found 3D points after mapping using the given pose. In this embodiment, the process for computing model coverage score is based on using a 3D lookup table 1800, as shown graphically in FIG. 18.

The overall size of this lookup table 1800 can depend on the size of the object in an illustrative embodiment, and each dimension is split into uniform bins 1810 (for example 2 mm×2 mm×2 mm can be used as the bin size for a reference object of 60 mm×60 mm×60 mm). In the depicted exemplary lookup table 1800, the dashed lines 1820 represent the model lines passing through respective bins 1810 of the lookup table 1800.

According to this scoring process, for each bin in the model lookup table:

(a) if there is a model line segment passing the bin, then set the bin's value to be 1;

(b) if the bin is inside the objects' interior, then set the bin's value to be −4 (using penalty for points inside the part interior); else (c) set the bin's value to be 0.

In an embodiment, any noise encountered within the scoring can be addressed by applying a distance tolerance value. In an embodiment a value of 3*distanceTolerance is used for filtering such noise, i.e., if a mapped point is inside the body interior, but less than 3*distanceTolerance from the part surface, no penalty is applied to this bin.

After mapping all the found 3D points using the given pose, the scoring process constructs another lookup table with the same size as the model lookup table as follows:

For each bin of the lookup table for the mapped found 3D points:

(a) if there is one mapped found point inside this bin, then set this bin's value to be 1;

(b) if there is one mapped found point inside its immediate neighbor, and the corresponding model lookup table bin has value larger than 0, then set this bin's value to be 1; else (c) set this bin's value to be 0.

The overall model coverage score for all bins derived above can then be characterized generally by the following equation:

$$\text{model\_coverage\_score} = \frac{\sum \text{model\_bin}(i) * \text{found\_points\_bin}(i)}{\sum_{\text{model\_bin}(j)==1} \text{model\_bin}(j)}$$

5. Combining Results of Scoring Processes

Figure 19:
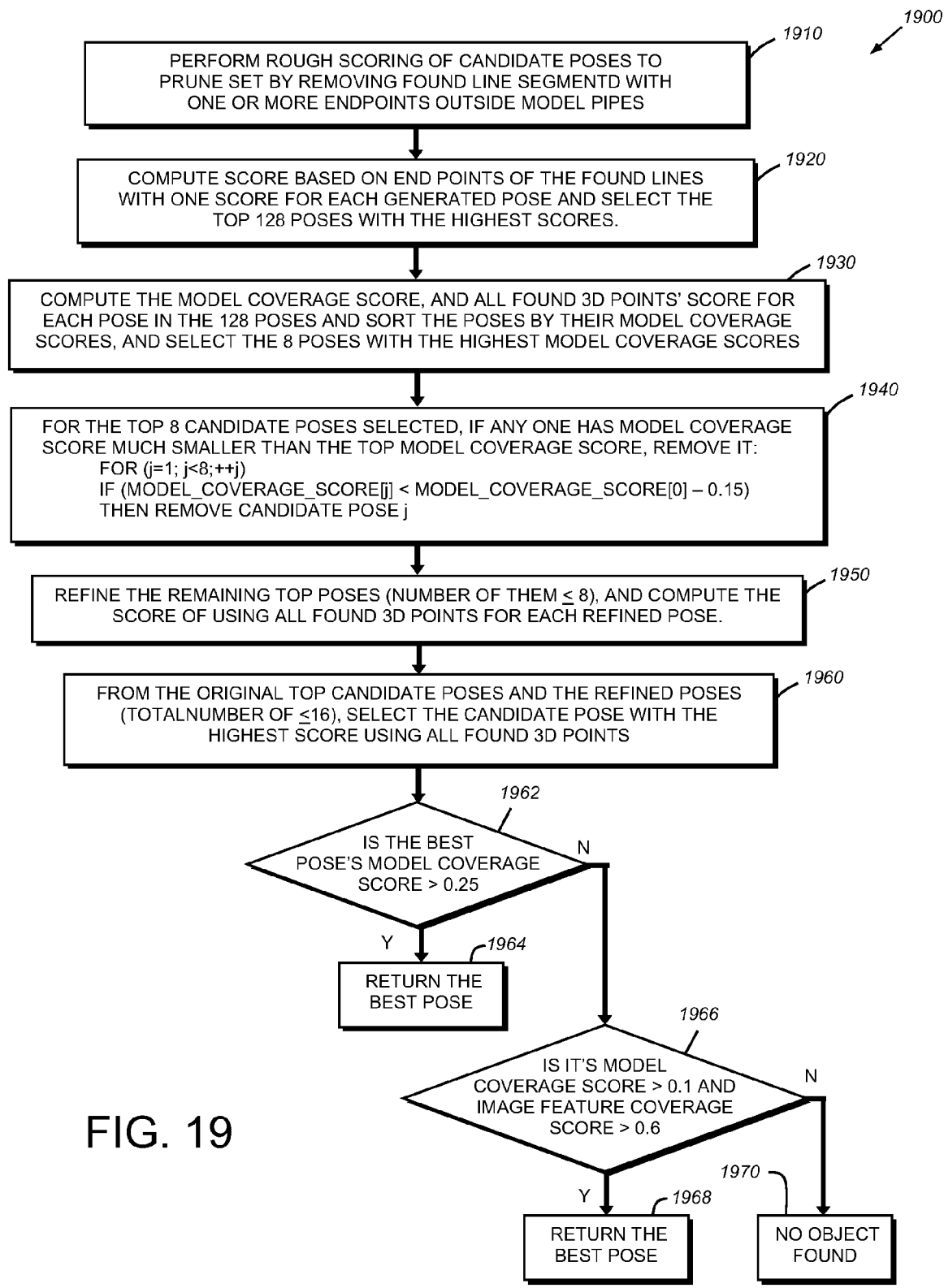
FIG. 19 is a flow diagram of the process steps employed to score candidate poses and thereby generate a finally selected high-scoring candidate 3D pose/alignment of the runtime object.

The pose fine scoring process 1900 is shown in further detail in the flow diagram of FIG. 19. This process 1900 refers variously to each of the scoring processes described above in respective sections 1-4. First, in step 1910, the process 1910 prunes the set of line segments by removing those sets with one or more endpoints residing outside the model pipes, thereby substantially pruning the number of candidate poses and associated found line segments. This corresponds to the coarse scoring step 250 in the overall alignment process of FIG. 2 described above. The pruned set of segments is provided to the fine scoring process (step 260 in FIG. 2) which employs the scoring processes of sections 2-4 above. According to step 1920, the process 1900 then computes the score based on using end points of the found lines in accordance with the process of section 1 above. One score is computed for each generated pose. In the illustrative embodiment, the highest scoring 128 poses are identified. Next, step 1930 computes the model coverage score (as described in the process of section 4 above) for each of the top 128 poses. The illustrative process 1900 also computes the score of all found 3D points in accordance with the process of section 2 above. The top 128 poses are then sorted by their model coverage scores, and (in this embodiment) the top 8 poses with the highest model coverage scores are selected from the 128 poses. In this embodiment, the 3D model coverage score is used to determine the top 128 candidate poses because the model coverage score is a normalized score, which does not depend on the density of 3D points in the scene. Rather, the score of all (or a predetermined large proportion of) 3D points depends on the density of the 3D points. In confusing images, for some incorrect poses where there are more 3D points (such as label text on a camera), the score of all found 3D points can be higher than the corresponding score for the correct pose of the part. In this manner, the use of model coverage scores to filter the larger group of candidate poses as the first step can retain the most promising poses in an illustrative embodiment.

Next, in step 1940, for the top 8 poses selected, if any one has a model coverage score significantly smaller (for example, proportionally 0.15 less model coverage) than the top model coverage score (model_coverage_score[0]), then the process 1900 removes this candidate pose. The procedure is defined by the following pseudocode statement:

For (j=1;j<8;++j)

If (model_coverage_score[j]<model_coverage_score [0]−0.15)

Then remove pose j.

Next, the process 1900 in step 1950 refines the remaining top candidate poses (the number of poses being ≦8 in this embodiment), and computes the score of each candidate pose using all found 3D points in accordance with the scoring process of section 3 above for each refined pose.

Next, according to step 1960, the process 1900 selects the high-scoring candidate 3D pose from a combination of the original one or more high-scoring candidate 3D poses (step 1930) and the more-refined top candidate poses, whereby the total number of candidate poses in the selection group is less than or equal to 16 in this embodiment. The step particularly employs the scoring process of section 3 above to select the candidate pose with the highest score of using all found 3D points in this embodiment. In this manner, the high-scoring candidate pose(s) can be verified according to their correspondence to the larger set of 3D points—or where appropriate, back to original 2D image points from various cameras in the arrangement (see step 270 in the overall alignment process 200 of FIG. 2).

Having selected a high-scoring refined candidate 3D pose, the process 1900, in decision step 1962 then determines whether the selected, high-scoring candidate 3D pose from step 1960 has sufficient correspondence with the model by determining whether the model coverage score for that pose exceeds a predetermined threshold. In this embodiment, the model coverage score threshold is greater than 0.25 or 25%. If this is exceeded, then the high-scoring pose is returned by the step 2162 as the alignment solution (step 1964). If the model coverage threshold is not exceeded, then decision step 1962 branches to further decision step 1966. The process 1900 then determines whether the model coverage score is greater than a lower threshold value (0.1 in this embodiment and whether the image feature coverage score is greater than a high threshold (0.6 in this embodiment). This image feature coverage is generally defined to be the ratio of found 3D points matching the candidate 3D pose.

Note that this process essentially verifies how well the points align with the model points within the various features for each candidate pose. As shown in the illustrative embodiment, this step can employ the three-dimensional points, or alternatively can be based upon individual sets of two-dimensional points from each individual sensor. In such case the model points corresponding to the sensor's image plane view are compared in two dimensions. It should be clear that this process requires higher processing overhead, and this advantageously only performed on a smaller group of candidate poses (for example, 16 poses), so as to avoid the use of substantial processing power on a larger group of candidates that are highly unlikely to be acceptable poses. Once each of the poses is scored during the fine scoring process the pose or poses with sufficiently high overall score are output as the high-scoring pose/alignment for the object. More generally, the image feature coverage determined by this step discretely represents the ratio of found 3D points fitting the given pose. This step thereby applies prior knowledge that if the part is in a non-confusing background, and most of the found 3D points fit well with the pose, then there is more confidence that the found high-scoring 3D pose is the correct pose even though the corresponding model coverage score is low. This scenario may arise because of an undesirable view direction for the object, occlusion of object features, etc. This step is not employed where the model coverage score is more accurate and less occlusion occurs (wherein step 1962 simply returns the final pose). Thus, where the image feature coverage score exceeds the threshold, and a minimal model coverage score exists, the decision step 1966 returns the high-scoring pose as the alignment solution. Alternatively, if one or both thresholds are not met by the pose, then the final pose is not an alignment solution and the system has failed to align the object (step 1970).

Note that it is expressly contemplated that the coarse and fine scoring processes described above can be substituted with other techniques that should be clear to those of ordinary skill. In alternate embodiments, more or fewer processes and types of processes can be used to score each candidate pose. Likewise, the number of candidate poses used at each step is highly variable. Where confidence is higher, fewer poses can be used in some steps to expedite the process. Likewise more poses can be employed to increase the robustness of the system in various embodiments. Likewise, there may be instances where a plurality of final poses within a given range is returned as the solution, to be averaged or acted upon by further refinement steps. In all cases the refined final pose can be subjected to further verification as appropriate using, for example runtime and model 2D and 3D images. More particularly, based on the estimated pose, the 2D images can be checked to determine whether there are expected features of the part on the proper image locations.

In further alternate embodiments it is expressly contemplated that the refining of poses following the pruning of line segments (or other types of HLGS) can be bypassed or omitted. This presumes that the scoring threshold in the initial correspondence step is sufficient to provide sufficient gross alignment accuracy, notwithstanding minor variations in the individual candidate poses. In such a case the values of the candidates can be averaged, a highest scoring pose can be output or another technique can be used to output the final pose.

According to a further alternate embodiment, based on the estimated pose, the object can be projected into the acquired images and the system can determine how many model lines are identified from the views. In this implementation, the process only counts model lookup table bins (used to derive the denominator used in computing the model coverage scores), which can be observed from the views of the object. This allows the process to provide a higher model coverage score for an object in spite of occlusion or portions thereof that reside partially outside of the respective images.

In a further alternate embodiment of the scoring process, the model lookup table bins which are near the black body corners (having no model lines pass them) can be set to a value of 1 (or an equivalent value) so as to compensate for rounded object corners that may not resolve into clearly discernable line segments or other HGLS.

In general, the scoring processes described herein should be taken as illustrative of a variety of possible techniques for narrowing down to number of candidate poses so as to select one or more high-scoring poses of the object.

It should be clear from the foregoing that a robust and accurate system and method for determining the six-degree-of-freedom 3D alignment of an object is provided by the illustrative embodiments. This system and method maximizes accuracy, while reducing processing overhead and increasing speed in an operation that is typically challenging and processor-time-consuming. This technique readily enables the images and point clouds from a multiplicity of 3D sensors located at various vantage points to be combined and collectively scored to obtain the most accurate alignment result. The techniques described herein, including the ability to extract distinct features, significantly enhance the alignment process' ability to identify objects in a cluttered or confusing background (where there are other objects, and or a stage with various geometric patterns that might confuse the vision system into mistakenly identifying such patterns as part of an object). The use of 3D features to align the object enhances the ability to distinguish such confusing and/or cluttered background elements and patterns.

Figure 20:
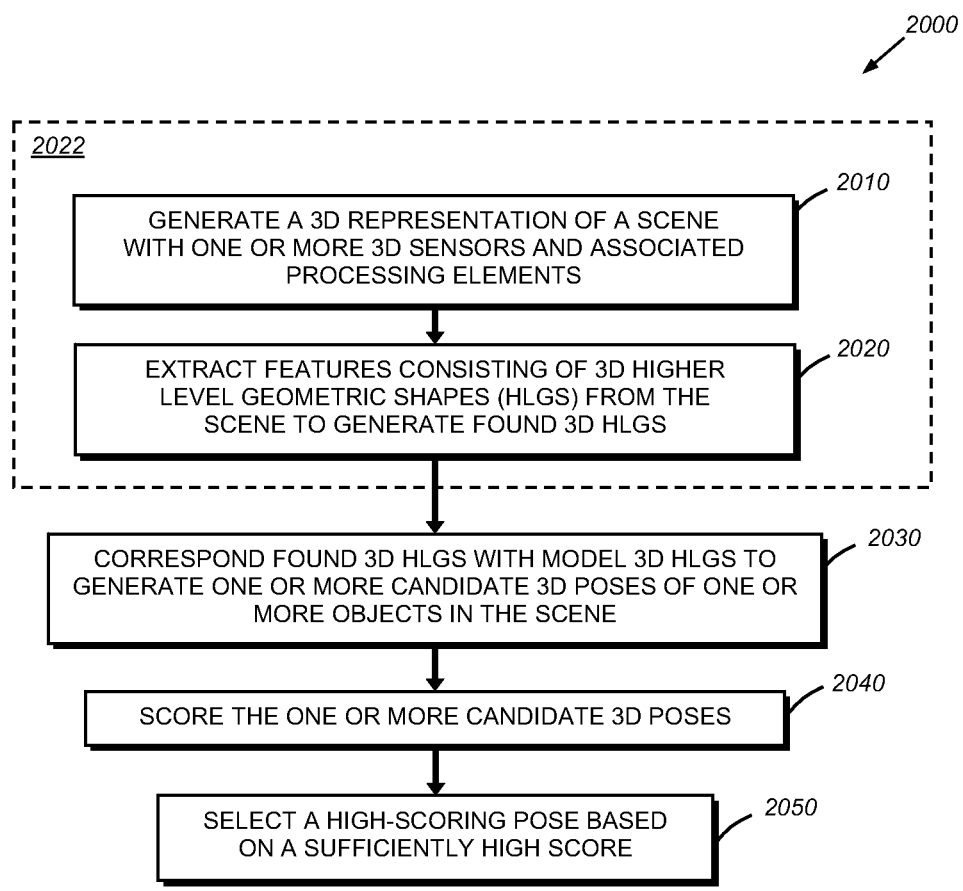
FIG. 20 is a flow diagram the overall 3D alignment process including base steps thereof according to various illustrative embodiments of this invention.

To again summarize, and with reference to FIG. 20, the generalized 3D alignment process 2000 in accordance with an illustrative embodiment is shown. The process 2000 begins with the generation of a 3D representation of a scene using one or more 3D sensors and associated integrated or separate processing elements (step 2010). This scene can include one or more objects for alignment. Likewise, the scene can include no resolvable objects, in which case the process 2000 subsequently returns a no-object or no good pose response. The process 2000 in step 2020 then extracts features from the 3D representation in the form of found 3D HLGS as described above. It is contemplated that a 3D sensor system can be adapted to directly provide a desired type of found 3D HGLS in a more-direct manner in an alternate embodiment. In other words, the 3D sensor system outputs found 3D HLGS rather than a representation (composed typically of points) from which found 3D HLGS are generated via feature extraction. Hence, steps 2010 and 2020 are grouped by dashed box 2022 to represent such an alternate arrangement in which the 3D sensor system generates the found 3D HLGS directly.

Next, in step 2030 the found 3D HLGS are corresponded to model 3D HLGS (provided to the system by a variety of mechanisms) so as to generate one or more candidate 3D poses of one or more objects within the scene from which the 3D representation (or directly generated found 3D HLGS) are derived. The generated 3D poses of the one or more objects are then scored using the scoring process as described variously herein (step 2040). Based upon the scores (which can be derived from a combination of coarse scoring, fine scoring and/or verification, etc.), a particular high-scoring pose is selected as the 3D alignment solution in step 2050. The absence of a sufficiently high scoring pose, conversely, results in a null result, with no object found and/or no alignment provided. The scoring process, feature extraction process and acquisition of a 3D representation, among other functions and processes contemplated herein, can occur in accordance with the various embodiments described above.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the coarse scoring step can be followed by additional low-processing-overhead coarse pruning steps prior to refinement of candidate poses during the fine scoring process that allow the number of candidate poses to be further reduced, thereby further reducing processing overhead. In addition, where the term "high" or other descriptions of degree are employed, these should be taken as conventions only. For example, a "high-scoring" value maybe defined by the smallest number, rather than the highest absolute number, or by another metric that differentiates degrees. Also, a variety of known techniques can be employed to further enhance and/or preprocess images prior to extraction of HLGS features. Additionally, the various steps and processes described herein can be further parallelized with multiple threads and/or processors to decrease the time needed to perform the overall alignment process. In various embodiments, this additional parallelization can particularly assist help to accentuate features and speed the correspondence process. Also, it is expressly contemplated that the system and method described herein can employ lighting, optical filtering and/or viewing stage surfaces that are particularly adapted to afford the best imaging environment for the particular object and/or camera arrangement. Likewise, it is expressly contemplated that the 3D point cloud formation, feature extraction, correspondence and refinement techniques can also employ pixel color information if and when appropriate to assist in distinguishing features. More generally, the 3D representation of a scene including one or more objects to be aligned can expressly include data representative of parameters beyond the x, y and z 3D pixel coordinates including, but not limited other geometric and non-geometric parameters such as pixel intensity, color, edge direction. The sensor and/or processor can be adapted according to conventional techniques to provide such information as required. Furthermore, the systems and methods described herein can be implemented using electronic hardware, software, consisting of a computer-readable medium of program instructions, or a combination of hardware and software. Accordingly, this description is meant to be taken only by way of example, and not to otherwise limit the scope of this invention.

What is claimed is:

1. A system for determining alignment of an object in three dimensional space (3D) comprising:
   one or more 3D sensors and one or more processing elements constructed and arranged to generate a 3D representation of a scene;
   a feature extraction process that generates a plurality of found 3D higher level geometric shapes (HLGS) of the scene from the 3D representation; and
   a correspondence process that compares the plurality of found 3D HLGS to a model 3D HLGS to generate one or more candidate 3D poses of one or more objects in the scene, the correspondence process being constructed and arranged to assign a score to each of the plurality of candidate 3D poses and select at least one of the plurality of candidate 3D poses having an assigned score greater than or equal to a predefined threshold.

2. The system as set forth in claim 1 wherein the one or more 3D sensors each comprise an arrangement of a plurality of 2D cameras.

3. The system as set forth in claim 2 wherein the one or more 3D sensors each comprise a stereo camera head.

4. The system as set forth in claim 1 wherein the 3D representation is defined by 3D coordinates and at least one other geometric or non-geometric parameter.

5. The system as set forth in claim 4 wherein the at least one other geometric or non-geometric parameter includes at least one of edge direction, color and intensity.

6. The system as set forth in claim 1 wherein the scene includes a cluttered or confusing background of elements, and the 3D sensors are positioned, and the feature extraction process is constructed and arranged, to distinguish HLGS from the cluttered or confusing background of elements.

7. The system as set forth in claim 1 wherein the scene includes a plurality of the objects therein, and the feature extraction process is constructed and arranged to distinguish HLGS of one or more of the plurality of the objects.

8. The system as set forth in claim 1 wherein the scene includes no resolvable objects therein, and each of the feature extraction process and the correspondence process is constructed and arranged to identify an absence of the resolvable objects in the scene.

9. The system as set forth in claim 1 wherein the correspondence process is constructed and arranged to score the one or more candidate 3D poses using (a) a coarse scoring process that generates a plurality of coarse scored candidate 3D poses, and (b) a fine scoring process that generates one or more fine scored candidate 3D poses from the one or more coarse scored candidate 3D poses.

10. The system as set forth in claim 1 further comprising a verification process that is constructed and arranged to compare at least one of a plurality of found 2D and found 3D points of the one or more objects with respect to at least one of a plurality of model 2D and model 3D points, and thereby derive the at least one high-scoring pose.

11. The system as set forth in claim 1 wherein the scoring process is constructed and arranged to (a) compute a model coverage score for the one or more candidate 3D poses, (b) provide one or more high scoring candidate 3D poses each having a high model coverage score, (c) refine respective poses of the high-scoring candidate 3D poses based upon a comparison of a plurality of found 3D points to a plurality of model 3D points, and (d) select the at least one high-scoring pose from a combination of the high-scoring candidate 3D poses and the refined candidate 3D poses.

12. The system as set forth in claim 1 wherein the scoring process is constructed and arranged to define predetermined geometric regions that surround each of the model 3D HLGS and remove at least one candidate 3D pose whose plurality of found 3D HLGS include portions thereof outside of the predetermined geometric regions respectively.

13. The system as set forth in claim 12 wherein a refined set of candidate 3D poses are generated based upon a fit of portions of the plurality of found 3D HLGS within the geometric regions.

14. The system as set forth in claim 13 wherein each of the plurality of found 3D HLGS and model 3D HLGS are line segments, the predetermined geometric regions are pipes having a cross sectional shape that is at least one of circular, ovular, polygonal, or an irregular enclosed shape, and wherein the portions are line segment endpoints.

15. The system as set forth in claim 13 wherein the portions comprise all or a predetermined proportion of a plurality of found 3D points with respect to the found 3D HLGS.

16. The system as set forth in claim 1 wherein the plurality of found 3D HLGS and the model 3D HLGS are based upon at least one of a line segment, an edgelet, a spline and a curve.

17. The system as set forth in claim 1 wherein the one or more 3D sensors include at least one trinocular camera head.

18. A method for determining alignment of an object in three dimensional (3D) space comprising:
  generating, with one or more 3D sensors and one or more processing elements, a 3D representation of a scene;
  extracting features so as to generate a plurality of found 3D higher level geometric shapes (HLGS) of the scene from the 3D representation; and
  corresponding the plurality of found 3D HLGS to a model 3D HLGS to generate one or more candidate 3D poses of one or more objects in the scene, including assigning a score to each of the one or more candidate 3D poses and selecting at least one of the plurality of candidate 3D poses having an assigned score greater than or equal to a predefined threshold.

19. The method as set forth in claim 18 wherein the 3D sensors comprise each of a plurality of stereo camera heads, and further comprising arranging each of the plurality of stereo camera heads at respective vantage points with respect to the scene so as to provide a less occluded and less obstructed view of the one or more objects in the scene.

20. The method as set forth in claim 18 wherein the step of corresponding includes scoring the one or more candidate 3D poses by (a) coarse scoring that generates one or more coarse scored candidate 3D poses, and (b) fine scoring that generates one or more fine scored candidate 3D poses from the one or more coarse scored candidate 3D poses.

21. The method as set forth in claim 20 further comprising comparing at least one of a plurality of found 2D and found 3D points of the one or more objects with respect to at least one of a plurality of model 2D and model 3D points to thereby derive the at least one high-scoring pose.

22. The method as set forth in claim 18 wherein the scoring step includes (a) computing a model coverage score for the one or more of the candidate 3D poses, (b) providing one or more high-scoring candidate 3D poses each having a high model coverage score, (c) refining respective poses of the high-scoring candidate 3D poses based upon a comparison of a plurality of found 3D points to a plurality of model 3D points, and (d) selecting the at least one high-scoring pose from a combination of the high-scoring candidate 3D poses and the refined candidate 3D poses.

23. The method as set forth in claim 18 wherein the scoring step includes defining predetermined geometric regions that surround each of the model 3D HLGS and removing at least one candidate 3D pose whose found 3D HLGS include portions thereof outside of the predetermined geometric regions respectively.

24. The method as set forth in claim 23 further comprising generating the a refined set of candidate 3D poses from the one or more candidate 3D poses based upon a fit of portions of the plurality of found 3D HLGS within the geometric regions.

25. The method as set forth in claim 24 wherein each of the plurality of found 3D HLGS and model 3D HLGS are line segments, the predetermined geometric regions are pipes having a cross sectional shape that is at least one of circular, ovular, polygonal, or an irregular enclosed shape, and wherein the portions are line segment endpoints.

26. The method as set forth in claim 24 wherein the portions comprise all or a predetermined proportion of a plurality of found 3D points with respect to the plurality of found 3D HLGS.

27. The method as set forth in claim 18 wherein the plurality of found 3D HLGS and the model 3D HLGS are based upon at least one of a line segment, an edgelet, a spline or a curve.

* * * * *